(12) United States Patent
Chen et al.

(10) Patent No.: US 11,017,501 B2
(45) Date of Patent: May 25, 2021

(54) DEMOSAICING METHOD AND APPARATUS

(71) Applicant: HUAWEI TECHNOLOGIES CO., LTD., Guangdong (CN)

(72) Inventors: Gang Chen, Beijing (CN); Wei Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 16/473,689

(22) PCT Filed: Dec. 28, 2016

(86) PCT No.: PCT/CN2016/112730
§ 371 (c)(1),
(2) Date: Jun. 26, 2019

(87) PCT Pub. No.: WO2018/119787
PCT Pub. Date: Jul. 5, 2018

(65) Prior Publication Data
US 2019/0333186 A1    Oct. 31, 2019

(51) Int. Cl.
  *G06K 9/00*    (2006.01)
  *G06T 3/40*    (2006.01)
  *G06T 7/90*    (2017.01)

(52) U.S. Cl.
CPC ............ *G06T 3/4015* (2013.01); *G06T 7/90* (2017.01)

(58) Field of Classification Search
CPC .............................. G06T 3/4015; G06T 7/90
(Continued)

(56) References Cited

U.S. PATENT DOCUMENTS 4,823,186 A * 4/1989 Muramatsu ............ H04N 9/045
348/236
6,404,918 B1 * 6/2002 Hel-Or .................. G06T 3/4015
382/167
(Continued)

FOREIGN PATENT DOCUMENTS

CN    103347190 A    10/2013
CN    103595982 A    2/2014
(Continued)

OTHER PUBLICATIONS

Lee, Wonjae, Seongjoo Lee, and Jaeseok Kim. "Cost-efffective color filter array demosaicing using spatial correlation." IEEE Transactions on Consumer Electronics 52.2 (2006): 547-554. (Year: 2006).*

(Continued)

*Primary Examiner* — Jonathan S Lee
(74) *Attorney, Agent, or Firm* — Fish & Richardson P.C.

(57) ABSTRACT

A method is applied to an electronic device including a color camera and a monochrome camera, and the color camera and the monochrome camera are disposed in parallel on the electronic device, includes: obtaining a to-be-processed color image obtained after the color camera photographs a target scenario, and extracting a first luminance component of the to-be-processed color image; obtaining a monochrome image obtained after the monochrome camera collects the target scenario at the same moment, and extracting a second luminance component of the monochrome image; performing registration on the first luminance component and the second luminance component by using a preset algorithm, to generate a third luminance component; extracting a chrominance component of the to-be-processed color image based on the third luminance component; and compositing a color output image based on the extracted chromi- (Continued)

nance component of the to-be-processed color image and the third luminance component.

18 Claims, 9 Drawing Sheets

(58) Field of Classification Search
USPC .......................................................... 382/167
See application file for complete search history.

(56) References Cited

U.S. PATENT DOCUMENTS

| | | | |
|---|---|---|---|
| 7,006,686 B2* | 2/2006 | Hunter | H04N 9/04557 382/162 |
| 2012/0044372 A1 | 2/2012 | Côté et al. | |
| 2015/0104100 A1 | 4/2015 | Zhu et al. | |
| 2015/0278996 A1 | 10/2015 | Tsutsumi | |
| 2017/0053379 A1 | 2/2017 | Wang et al. | |

FOREIGN PATENT DOCUMENTS

| | | |
|---|---|---|
| CN | 103841388 A | 6/2014 |
| CN | 104320575 A | 1/2015 |
| CN | 105049718 A | 11/2015 |
| CN | 105141838 A | 12/2015 |
| CN | 105578063 A | 5/2016 |

OTHER PUBLICATIONS

Prakash, VNV Satya, K. Satya Prasad, and T. Jaya Chandra Prasad. "Dennosaicing of color images by accurate estimation of luminance." Telkomnika 14.1 (2016): 47. (Year: 2016).*

Leung et al., "Least-Squares Luma-Chroma Demultiplexing Algorithm for Bayer Demosaicking," IEEE Transactions on Image Processing, vol. 20, No. 7, Jul. 2011, pp. 1885-1894.

PCT International Search Report and Written Opinion issued in International Application No. PCT/CN2016/112730 dated Sep. 18, 2017, 17 pages (with English translation).

Office Action issued in Chinese application No. 201680091740.8 dated Nov. 28, 2019, 11 pages (With English Translation).

Condat, "A new color filter array with optimal sensing properties", 2009 16th IEEE International Conference on Image Processing (ICIP), 4 pages.

Extended European Search Report issued in European Application No. 16925966.0 dated Nov. 18, 2019, 10 pages.

* cited by examiner

DEMOSAICING METHOD AND APPARATUS

TECHNICAL FIELD

This application relates to the field of digital imaging technologies, and in particular, to a demosaicing method and apparatus.

BACKGROUND

Currently, single-lens reflex cameras, cube cameras, or mobile phones all obtain a color image through monochrome sensor imaging. The monochrome sensor imaging is implemented based on a Bayer (Bayer) color filter array (English: Color Filter Array, CFA for short). Generally, in the Bayer CFA, only one of red green blue (RGB) channel signals can be captured at one pixel location. If a full color image (for example, an RGB image) needs to be reproduced, the other two unknown channel signals at the pixel location need to be restored. In the prior art, other two unknown channel signals at one pixel location are usually restored by using a demosaicing (demosaicing) method.

Generally, in the demosaicing method, a monochrome image is collected by using a single-camera system, and interpolation is performed in a horizontal or vertical direction for each color channel signal, to obtain other two color channel signals, thereby constituting a color image. The other color channel signals obtained merely through interpolation are not accurate enough, and therefore moire (aliasing) occurs at a high-frequency location of the color image, and a fine-textured region of the color image is blurred, causing a reduction in image resolution.

SUMMARY

Embodiments of this application provide a demosaicing method and apparatus, to resolve a prior-art problem that image resolution is reduced.

According to a first aspect, an embodiment of this application provides a demosaicing method, where the method is applied to an electronic device including a color camera and a monochrome camera, the color camera and the monochrome camera are disposed in parallel in the electronic device, and the method includes:

obtaining a to-be-processed color image obtained after the color camera photographs a target scenario, and extracting a first luminance component of the to-be-processed color image; obtaining a monochrome image obtained after the monochrome camera collects the target scenario at the same moment, and extracting a second luminance component of the monochrome image; performing registration on the first luminance component and the second luminance component by using a preset algorithm (the preset algorithm may be an optical flow algorithm, a fast matching algorithm, a feature matching algorithm, or the like), to generate a third luminance component; extracting a chrominance component of the to-be-processed color image based on the third luminance component; and compositing a color output image based on the extracted chrominance component of the to-be-processed color image and the third luminance component.

In the method provided in this embodiment of the present invention, luminance information collected by the monochrome camera is used to instruct the color camera to perform demosaicing, so that a true luminance signal and a true chrominance signal of a color image can be obtained through resolution from an aliasing spectrum, to restore a true color image, thereby improving resolution.

In a possible design, the chrominance component of the to-be-processed color image includes a first chrominance component and a second chrominance component, and the extracting a chrominance component of the to-be-processed color image based on the third luminance component can be implemented in the following manner:

extracting the first chrominance component of the to-be-processed color image by using a first pre-trained filter, and extracting the second chrominance component of the to-be-processed color image based on the third luminance component and the extracted first chrominance component by using a second pre-trained filter.

In the foregoing design, the two chrominance components (for example, a hue and saturation) included in the to-be-processed color image are extracted by using the two filters, so that the extracted chrominance components are truer and more effective.

In a possible design, the first filter is trained in the following manner:

obtaining an image training set, where the image training set includes K first images, and each pixel in each first image includes a red R component, a green G component, and a blue B component;

generating an $i^{th}$ CFA image that is corresponding to an $i^{th}$ first image and that is arranged based on a color filter array CFA;

converting, based on the $i^{th}$ CFA image, the $i^{th}$ first image into an $i^{th}$ second image whose pixel includes one luminance component, a first chrominance component, and a second chrominance component, where i is any positive integer not greater than K;

inputting K CFA images to an initialized first filter for iterative processing;

after an $i^{th}$ iteration, obtaining an error between a first chrominance component included in the $i^{th}$ second image that is input to the first filter during the $i^{th}$ iteration and a first chrominance component obtained after the $i^{th}$ iterative processing; and adjusting a parameter value in a filtering window of the first filter in an $(i+1)^{th}$ iteration process based on the error.

Each first image may be photographed by a high-quality single-lens reflex camera. Each first image is a high definition image, and has relatively high resolution. In addition, the first image may be a natural scenery image.

In the foregoing manner, a first chrominance signal is trained and extracted by using a luminance signal, so that the first chrominance component is more accurate and effective when being extracted based on the luminance signal of the image by using the first filter trained in the foregoing manner.

In a possible design, the $i^{th}$ second image meets conditions shown in the following formulas:

$$f^i_L[n_1,n_2]=\tfrac{1}{4}f^i_R[n_1,n_2]+\tfrac{1}{2}f^i_G[n_1,n_2]+\tfrac{1}{4}f^i_B[n_1,n_2]$$

$$f^i_{c1m}[n_1,n_2]=(-\tfrac{1}{4}f^i_R[n_1,n_2]+\tfrac{1}{2}f^i_G[n_1,n_2]-\tfrac{1}{4}f^i_B[n_1,n_2])(-1)^{n_1+n_2}$$

$$f^i_{c2m}[n_1,n_2]=f^i_{CFA}[n_1,n_2]-f^i_L[n_1,n_2]-f^i_{c1m}[n_1,n_2],$$

where $f^i_L[n_1,n_2]$ represents a luminance component of a pixel with coordinates $[n_1,n_2]$ in the $i^{th}$ second image, $f^i_{c1m}[n_1,n_2]$ represents a first chrominance component of the pixel with the coordinates $[n_1,n_2]$ in the $i^{th}$ second image, $f^i_{c2m}[n_1,n_2]$ represents a second chrominance component of the pixel with the coordinates $[n_1,n_2]$ in the $i^{th}$ second image, $f^i_R[n_1,$ $n_2$] represents an R component of a pixel with coordinates $[n_1,n_2]$ in the $i^{th}$ first image, $f^i_G[n_1,n_2]$ represents a G component of the pixel with the coordinates $[n_1,n_2]$ in the $i^{th}$ first image, $f^i_B[n_1,n_2]$ represents a B component of the pixel with the coordinates $[n_1,n_2]$ in the $i^{th}$ first image, $f^i_{CFA}[n_1,n_2]$ represents a pixel value of a pixel with coordinates $[n_1,n_2]$ in the $i^{th}$ CFA image, $n_1$ represents a horizontal pixel location in an image, and $n_2$ represents a vertical pixel location in the image.

In a possible design, the first filter meets conditions shown in the following formulas:

$$\hat{f}^i_{c1m} = \sum_{[k_1,k_2]\in B} h_1[k_1,k_2] f^i_{CFA}[n_1 - k_1, n_2 - k_2]$$

$$TSE_{c1} = \sum_{i=1}^{K} \sum_{[n_1,n_2]\in A_i} (\hat{f}^i_{c1m}[n_1,n_2] - f^i_{c1m}[n_1,n_2])^2$$

$$h_1^* = \underset{h_1}{\operatorname{argmin}} TSE_{C1},$$

where $h_1[k_1,k_2]$ represents a parameter with coordinates $[k_1,k_2]$ in the filtering window of the first filter, B represents a size of the filtering window of the first filter, $f^i_{CFA}[n_1-k_1,n_2-k_2]$ represents a pixel value of a pixel with coordinates $[n_1-k_1, n_2-k_2]$ in the $i^{th}$ CFA image, $f^i_{c1m}[n_1,n_2]$ represents the first chrominance component of the $i^{th}$ second image, $\hat{f}^i_{c1m}[n_1,n_2]$ represents a first chrominance component obtained after the $i^{th}$ CFA image is input to the first filter, $A_i$ represents a size of the $i^{th}$ CFA image, $TSE_{c1}$ represents an error function corresponding to the first chrominance component, $$\underset{h_1}{\operatorname{argmin}} TSE_{C1}$$

represents a value of $h_1$ when a value of the error function is smallest, and $h^*_1$ represents a first filter obtained after an iterative update.

When the first filter is trained in the foregoing implementation, there is a minimum error between a first chrominance component extracted after an input image is processed by using the first filter and an original true first chrominance component of the input image, so that the first chrominance component is highly accurate when being extracted by using the trained first filter.

In a possible design, the second filter is trained in the following manner:

inputting CFA images corresponding to the K first images to an initialized second filter for iterative processing;

after an $i^{th}$ iteration, obtaining an error between a second chrominance component included in the $i^{th}$ second image that is input to the second filter during the $i^{th}$ iteration and a second chrominance component obtained after the $i^{th}$ iterative processing; and adjusting a parameter value in a filtering window of the second filter in an $(i+1)^{th}$ iteration process based on the error.

In the foregoing manner, a second chrominance signal is trained and extracted by using the luminance signal, so that the second chrominance component is more accurate and effective when being extracted based on the luminance signal of the image by using the second filter trained in the foregoing manner.

In a possible design, the second filter meets conditions shown in the following formulas:

$$g^i_{CFA} = f^i_{CFA} - f^i_{c1m} - f^i_L$$

$$\hat{f}^i_{c2m} = \sum_{[l_1,l_2]\in D} h_2[l_1,l_2] g^i_{CFA}[n_1 - l_1, n_2 - l_2]$$

$$TSE_{c2} = \sum_{i=1}^{K} \sum_{[n_1,n_2]\in A_i} (\hat{f}^i_{c2m}[n_1,n_2] - f^i_{c2m}[n_1,n_2])^2$$

$$h_2^* = \underset{h_2}{\operatorname{argmin}} TSE_{C2},$$

where $h_2[l_1,l_2]$ represents a parameter with coordinates $[l_1,l_2]$ in the filtering window of the second filter, D represents a size of the filtering window of the second filter, $f^i_{CFA}$ represents the $i^{th}$ CFA image, $f^i_{c1m}[n_1,n_2]$ represents the first chrominance component of the $i^{th}$ second image, $f^i_L$ represents a luminance component of the $i^{th}$ second image, $A_i$ represents the size of the $i^{th}$ CFA image, $TSE_{c2}$ represents an error function corresponding to the second chrominance component, $$\underset{h_2}{\operatorname{argmin}} TSE_{C2}$$

represents a value of $h_2$ when a value of the error function $TSE_{c2}$ is smallest, and $h^*_2$ represents a second filter obtained after an iterative update.

When the second filter is trained in the foregoing implementation, there is a minimum error between a second chrominance component extracted after the input image is processed by the second filter and an original true second chrominance component of the input image, so that the second chrominance component is highly accurate when being extracted by using the trained second filter.

In a possible design, the extracting the first chrominance component of the to-be-processed color image based on the third luminance component by using a first pre-trained filter can be implemented in the following manner:

extracting the first chrominance component of the to-be-processed color image by using the following formula:

$C_1[n_1,n_2] = [h_1 * f_{CFA}[n_1,n_2]](-1)^{n_1+n_2}$, where $C_1[n_1,n_2]$ represents an extracted first chrominance component of a pixel with coordinates $[n_1,n_2]$ in the to-be-processed color image, $h_1$ represents the first filter, and $f_{CFA}[n_1,n_2]$ represents a color component of the pixel with the coordinates $[n_1,n_2]$ in the to-be-processed color image before extraction is performed.

In a possible design, the extracting the second chrominance component of the to-be-processed color image based on the third luminance component and the extracted first chrominance component by using a second pre-trained filter includes:

extracting the second chrominance component of the to-be-processed color image based on a condition shown in the following formula:

$C_2[n_1,n_2] = [h_2 *(f_{CFA}[n_1,n_2] - f_L[n_1,n_2] - h_1 * f_{CFA}[n_1,n_2])](-1)^{n_1}$, where $C_2[n_1,n_2]$ represents an extracted second chrominance component of the pixel with the coordinates $[n_1,n_2]$ in the to-be-processed color image, $h_1$ represents the first filter, $f^c{}_{CFA}[n_1,n_2]$ represents the color component of the pixel with the coordinates $[n_1,n_2]$ in the to-be-processed color image before extraction is performed, $h_2$ represents the second filter, and $f^c{}_{CFA}[n_1,n_2]$ represents a third luminance component of the pixel with the coordinates $[n_1,n_2]$ in the to-be-processed color image after registration is performed.

In a possible design, the compositing a color output image based on the extracted chrominance component of the to-be-processed color image and the third luminance component includes:

generating, based on conditions shown in the following formulas, the color image corresponding to the to-be-processed color image:

$$R = f_L - C_1 - 2C_2$$

$$G = f_L + C_1$$

$$B = f_L - C_1 + 2C_2, \text{ where}$$

R represents a red component of the color output image, G represents a green component of the color output image, B represents a blue component of the color output image, $f_L$ represents the extracted third luminance component of the to-be-processed color image, $C_1$ represents the extracted first chrominance component of the to-be-processed color image, and $C_2$ represents the extracted second chrominance component of the to-be-processed color image.

According to a second aspect, an embodiment of this application provides a demosaicing apparatus, where the apparatus is applied to an electronic device including a color camera and a monochrome camera, the color camera and the monochrome camera are disposed in parallel in the electronic device, and the apparatus includes:

an obtaining module, configured to: obtain a to-be-processed color image obtained after the color camera photographs a target scenario, and obtain a monochrome image obtained after the monochrome camera collects the target scenario at the same moment;

a first extraction module, configured to: extract a first luminance component of the to-be-processed color image obtained by the obtaining module, and extract a second luminance component of the monochrome image;

a registration module, configured to perform registration on the first luminance component and the second luminance component by using a preset algorithm, to generate a third luminance component;

a second extraction module, configured to extract a chrominance component of the to-be-processed color image based on the third luminance component; and a generation module, configured to composite a color output image based on the extracted chrominance component of the to-be-processed color image and the third luminance component.

In a possible design, the second extraction module is specifically configured to: extract a first chrominance component of the to-be-processed color image by using a first pre-trained filter, and extract a second chrominance component of the to-be-processed color image based on the third luminance component and the extracted first chrominance component by using a second pre-trained filter.

In a possible design, the apparatus further includes a training module, where the training module is configured to train the first filter in the following manner:

obtaining an image training set, where the image training set includes K first images, and each pixel in each first image includes a red R component, a green G component, and a blue B component;

generating an $i^{th}$ CFA image that is corresponding to an $i^{th}$ first image and that is arranged based on a color filter array CFA;

converting, based on the $i^{th}$ CFA image, the $i^{th}$ first image into an $i^{th}$ second image whose pixel includes one luminance component, a first chrominance component, and a second chrominance component, where i is any positive integer not greater than K;

inputting K CFA images to an initialized first filter for iterative processing;

after an $i^{th}$ iteration, obtaining an error between a first chrominance component included in the $i^{th}$ second image that is input to the first filter during the $i^{th}$ iteration and a first chrominance component obtained after the $i^{th}$ iterative processing; and adjusting a parameter value in a filtering window of the first filter in an $(i+1)^{th}$ iteration process based on the error.

In a possible design, the $i^{th}$ second image meets conditions shown in the following formulas:

$$f^i{}_L[n_1,n_2] = \tfrac{1}{4}f^i{}_R[n_1,n_2] + \tfrac{1}{2}f^i{}_G[n_1,n_2] + \tfrac{1}{4}f^i{}_B[n_1,n_2]$$

$$f^i{}_{c1m}[n_1,n_2] = (-\tfrac{1}{4}f^i{}_R[n_1,n_2] + \tfrac{1}{2}f^i{}_G[n_1,n_2] - \tfrac{1}{4}f^i{}_B[n_1,n_2]) (-1)^{n_1+n_2}$$

$$f^i{}_{c2m}[n_1,n_2] = f^i{}_{CFA}[n_1,n_2] - f^i{}_L[n_1,n_2] - f^i{}_{c1m}[n_1,n_2],$$
where $f^i{}_L[n_1\,n_2]$ represents a luminance component of a pixel with coordinates $[n_1,n_2]$ in the $i^{th}$ second image, $f^i{}_{c1m}[n_1,n_2]$ represents a first chrominance component of the pixel with the coordinates $[n_1,n_2]$ in the $i^{th}$ second image, $f^i{}_{c2m}[n_1,n_2]$ represents a second chrominance component of the pixel with the coordinates $[n_1,n_2]$ in the $i^{th}$ second image, $f^i{}_R[n_1,n_2]$ represents an R component of a pixel with coordinates $[n_1,n_2]$ in the $i^{th}$ first image, $f^i{}_G[n_1,n_2]$ represents a G component of the pixel with the coordinates $[n_1,n_2]$ in the $i^{th}$ first image, $f^i{}_B[n_1,n_2]$ represents a B component of the pixel with the coordinates $[n_1,n_2]$ in the $i^{th}$ first image, $f^i{}_{CFA}[n_1,n_2]$ represents a pixel value of a pixel with coordinates $[n_1,n_2]$ in the $i^{th}$ CFA image, $n_1$ represents a horizontal pixel location in an image, and $n_2$ represents a vertical pixel location in the image.

In a possible design, the first filter meets conditions shown in the following formulas:

$$\hat{f}^i_{c1m} = \sum_{[k_1,k_2]\in B} h_1[k_1,k_2] f^i_{CFA}[n_1-k_1, n_2-k_2]$$

$$TSE_{c1} = \sum_{i=1}^{K} \sum_{[n_1,n_2]\in A_i} \left(\hat{f}^i_{c1m}[n_1,n_2] - f^i_{c1m}[n_1,n_2]\right)^2$$

$$h_1^* = \underset{h_1}{\operatorname{argmin}} TSE_{C1},$$

where $h_1[k_1,k_2]$ represents a parameter with coordinates $[k_1,k_2]$ in the filtering window of the first filter, B represents a size of the filtering window of the first filter, $f^i{}_{CFA}[n_1-k_1,n_2-k_2]$ represents a pixel value of a pixel with coordinates $[n_1-k_1, n_2-k_2]$ in the $i^{th}$ CFA image, $f^i{}_{c1m}[n_1,n_2]$ represents the first chrominance component of the $i^{th}$ second image, $\hat{f}^i{}_{c1m}[n_1,n_2]$ represents a first chrominance component obtained after the $i^{th}$ CFA image is input to the first filter, $A_i$ represents a size of the $i^{th}$ CFA image, $TSE_{c1}$ represents an error function corresponding to the first chrominance component, $$\underset{h_1}{\operatorname{argmin}} TSE_{C1}$$

represents a value of $h_1$ when a value of the error function is smallest, and $h^*_1$ represents a first filter obtained after an iterative update.

In a possible design, the training module is further configured to train the second filter in the following manner:

inputting CFA images corresponding to the K first images to an initialized second filter for iterative processing;

after an $i^{th}$ iteration, obtaining an error between a second chrominance component included in the $i^{th}$ second image that is input to the second filter during the $i^{th}$ iteration and a second chrominance component obtained after the $i^{th}$ iterative processing; and adjusting a parameter value in a filtering window of the second filter in an $(i+1)^{th}$ iteration process based on the error.

In a possible design, the second filter meets conditions shown in the following formulas:

$$g^i_{CFA} = f^i_{CFA} - f^i_{c1m} - f^i_L$$

$$\hat{f}^i_{c2m} = \sum_{[l_1,l_2] \in D} h_2[l_1, l_2] g^i_{CFA}[n_1 - l_1, n_2 - l_2]$$

$$TSE_{c2} = \sum_{i=1}^{K} \sum_{[n_1,n_2] \in A_i} (\hat{f}^i_{c2m}[n_1, n_2] - f^i_{c2m}[n_1, n_2])^2$$

$$h^*_2 = \underset{h_2}{\operatorname{argmin}} TSE_{C2},$$

where $h_2[l_1,l_2]$ represents a parameter with coordinates $[l_1,l_2]$ in the filtering window of the second filter, D represents a size of the filtering window of the second filter, $f^i_{CFA}$ represents the $i^{th}$ CFA image, $f^i_{c1m}[n_1,n_2]$ represents the first chrominance component of the $i^{th}$ second image, $f^i_L$ represents a luminance component of the $i^{th}$ second image, $A_i$ represents the size of the $i^{th}$ CFA image, $TSE_{c2}$ represents an error function corresponding to the second chrominance component, $$\underset{h_2}{\operatorname{argmin}} TSE_{C2}$$

represents a value of $h_2$ when a value of the error function $TSE_{c2}$ is smallest, and $h^*_2$ represents a second filter obtained after an iterative update.

In a possible design, when extracting the first chrominance component of the to-be-processed color image based on the third luminance component by using the first pre-trained filter, the second extraction module is specifically configured to extract the first chrominance component of the to-be-processed color image by using the following formula:

$C_1[n_1,n_2] = [h_1 * f^c_{CFA}[n_1,n_2]](-1)^{n_1+n_2}$, where $C_1[n_1,n_2]$ represents an extracted first chrominance component of a pixel with coordinates $[n_1,n_2]$ in the to-be-processed color image, $h_1$ represents the first filter, and $f^c_{CFA}[n_1,n_2]$ represents a color component of the pixel with the coordinates $[n_1,n_2]$ in the to-be-processed color image before extraction is performed.

In a possible design, when extracting the second chrominance component of the to-be-processed color image based on the third luminance component and the extracted first chrominance component by using the second pre-trained filter, the second extraction module is specifically configured to extract the second chrominance component of the to-be-processed color image based on a condition shown in the following formula:

$C_2[n_1,n_2] = [h_2 * (f^c_{CFA}[n_1,n_2] - f^c_L[n_1,n_2] - h_1 * f^c_{CFA}[n_1,n_2]])(-1)^{n_1}$, where $C_2[n_1,n_2]$ represents an extracted second chrominance component of the pixel with the coordinates $[n_1,n_2]$ in the to-be-processed color image, $h_1$ represents the first filter, $f^c_{CFA}[n_1,n_2]$ represents the color component of the pixel with the coordinates $[n_1,n_2]$ in the to-be-processed color image before extraction is performed, $h_2$ represents the second filter, and $f^c_L[n_1,n_2]$ represents a third luminance component of the pixel with the coordinates $[n_1,n_2]$ in the to-be-processed color image after registration is performed.

In a possible design, the generation module is specifically configured to composite the color output image based on conditions shown in the following formulas:

$R = f_L - C_1 - 2C_2$ $G = f_L + C_1$ $B = f_L - C_1 + 2C_2$, where

R represents a red component of the color image, G represents a green component of the color image, B represents a blue component of the color image, $f_L$ represents the third luminance component, $C_1$ represents the extracted first chrominance component of the to-be-processed color image, and $C_2$ represents the extracted second chrominance component of the to-be-processed color image.

According to a third aspect, an embodiment of this application provides an electronic device, including:

a color camera, a monochrome camera, a memory, a screen, and a processor, where the color camera is configured to photograph a static or dynamic color image;

the monochrome camera is configured to photograph a static or dynamic monochrome image;

the memory is configured to store the image collected by the color camera and the image collected by the monochrome camera;

the processor is configured to: obtain a to-be-processed color image obtained after the color camera photographs a target scenario, and extract a first luminance component of the to-be-processed color image; obtain a monochrome image obtained after the monochrome camera collects the target scenario at the same moment, and extract a second luminance component of the monochrome image; perform registration on the first luminance component and the second luminance component by using a preset algorithm, to generate a third luminance component; extract a chrominance component of the to-be-processed color image based on the third luminance component; and composite a color output image based on the extracted chrominance component of the to-be-processed color image and the third luminance component; and the screen is configured to display the color output image.

In a possible design, the chrominance component of the to-be-processed color image includes a first chrominance component and a second chrominance component, and when extracting the chrominance component of the to-be-processed color image based on the third luminance component, the processor is specifically configured to:

extract the first chrominance component of the to-be-processed color image by using a first pre-trained filter, and extract the second chrominance component of the to-be-processed color image based on the third luminance component and the extracted first chrominance component by using a second pre-trained filter.

In a possible design, the processor is further configured to train the first filter in the following manner:

obtaining an image training set, where the image training set includes K first images, and each pixel in each first image includes a red R component, a green G component, and a blue B component;

generating an $i^{th}$ CFA image that is corresponding to an $i^{th}$ first image and that is arranged based on a color filter array CFA;

converting, based on the $i^{th}$ CFA image, the $i^{th}$ first image into an $i^{th}$ second image whose pixel includes one luminance component, a first chrominance component, and a second chrominance component, where i is any positive integer not greater than K;

inputting K CFA images to an initialized first filter for iterative processing;

after an $i^{th}$ iteration, obtaining an error between a first chrominance component included in the $i^{th}$ second image that is input to the first filter during the $i^{th}$ iteration and a first chrominance component obtained after the $i^{th}$ iterative processing; and adjusting a parameter value in a filtering window of the first filter in an $(i+1)^{th}$ iteration process based on the error.

In a possible design, the $i^{th}$ second image meets conditions shown in the following formulas:

$$f^i_L[n_1,n_2] = \tfrac{1}{4} f^i_R[n_1,n_2] + \tfrac{1}{2} f^i_G[n_1,n_2] + \tfrac{1}{4} f^i_B[n_1,n_2]$$

$$f^i_{c1m}[n_1,n_2] = (-\tfrac{1}{4} f^i_R[n_1,n_2] + \tfrac{1}{2} f^i_G[n_1,n_2] - \tfrac{1}{4} f^i_B[n_1,n_2])(-1)^{n_1+n_2}$$

$$f^i_{c2m}[n_1,n_2] = f^i_{CFA}[n_1,n_2] - f^i_L[n_1,n_2] - f^i_{c1m}[n_1,n_2],$$

where $f^i_L[n_1,n_2]$ represents a luminance component of a pixel with coordinates $[n_1,n_2]$ in the $i^{th}$ second image, $f^i_{c1m}[n_1,n_2]$ represents a first chrominance component of the pixel with the coordinates $[n_1,n_2]$ in the $i^{th}$ second image, $f^i_{c2m}[n_1,n_2]$ represents a second chrominance component of the pixel with the coordinates $[n_1,n_2]$ in the $i^{th}$ second image, $f^i_R[n_1,n_2]$ represents an R component of a pixel with coordinates $[n_1,n_2]$ in the $i^{th}$ first image, $f^i_G[n_1,n_2]$ represents a G component of the pixel with the coordinates $[n_1,n_2]$ in the $i^{th}$ first image, $f^i_B[n_1,n_2]$ represents a B component of the pixel with the coordinates $[n_1,n_2]$ in the $i^{th}$ first image, $f^i_{CFA}[n_1,n_2]$ represents a pixel value of a pixel with coordinates $[n_1,n_2]$ in the $i^{th}$ CFA image, $n_1$ represents a horizontal pixel location in an image, and $n_2$ represents a vertical pixel location in the image.

In a possible design, the first filter meets conditions shown in the following formulas:

$$\hat{f}^i_{c1m} = \sum_{[k_1,k_2] \in B} h_1[k_1,k_2] f^i_{CFA}[n_1 - k_1, n_2 - k_2]$$

$$TSE_{c1} = \sum_{i=1}^{K} \sum_{[n_1,n_2] \in A_i} \left( \hat{f}^i_{c1m}[n_1,n_2] - f^i_{c1m}[n_1,n_2] \right)^2$$

$$h^*_1 = \underset{h_1}{\operatorname{argmin}} TSE_{C1},$$

where $h_1[k_1,k_2]$ represents a parameter with coordinates $[k_1,k_2]$ in the filtering window of the first filter, B represents a size of the filtering window of the first filter, $f^i_{CFA}[n_1-k_1,n_2-k_2]$ represents a pixel value of a pixel with coordinates $[n_1-k_1, n_2-k_2]$ in the $i^{th}$ CFA image, $f^i_{c1m}[n_1,n_2]$ represents the first chrominance component of the $i^{th}$ second image, $\hat{f}^i_{c1m}[n_1,n_2]$ represents a first chrominance component obtained after the $i^{th}$ CFA image is input to the first filter, $A_i$ represents a size of the $i^{th}$ CFA image, $TSE_{c1}$ represents an error function corresponding to the first chrominance component, $$\underset{h_1}{\operatorname{argmin}} TSE_{C1}$$

represents a value of $h_1$ when a value of the error function is smallest, and $h^*_1$ represents a first filter obtained after an iterative update.

In a possible design, the processor is further configured to train the second filter in the following manner:

inputting CFA images corresponding to the K first images to an initialized second filter for iterative processing;

after an $i^{th}$ iteration, obtaining an error between a second chrominance component included in the $i^{th}$ second image that is input to the second filter during the $i^{th}$ iteration and a second chrominance component obtained after the $i^{th}$ iterative processing; and adjusting a parameter value in a filtering window of the second filter in an $(i+1)^{th}$ iteration process based on the error.

In a possible design, the second filter meets conditions shown in the following formulas:

$$g^i_{CFA} = f^i_{CFA} - f^i_{c1m} - f^i_L$$

$$\hat{f}^i_{c2m} = \sum_{[l_1,l_2] \in D} h_2[l_1,l_2] g^i_{CFA}[n_1 - l_1, n_2 - l_2]$$

$$TSE_{c2} = \sum_{i=1}^{K} \sum_{[n_1,n_2] \in A_i} \left( \hat{f}^i_{c2m}[n_1,n_2] - f^i_{c2m}[n_1,n_2] \right)^2$$

$$h^*_2 = \underset{h_2}{\operatorname{argmin}} TSE_{C2},$$

where $h_2[l_1,l_2]$ represents a parameter with coordinates $[l_1,l_2]$ in the filtering window of the second filter, D represents a size of the filtering window of the second filter, $f^i_{CFA}$ represents the $i^{th}$ CFA image, $f^i_{c1m}[n_1,n_2]$ represents the first chrominance component of the $i^{th}$ second image, $f^i_L$ represents a luminance component of the $i^{th}$ second image, $A_i$ represents the size of the $i^{th}$ CFA image, $TSE_{c2}$ represents an error function corresponding to the second chrominance component, $$\underset{h_2}{\operatorname{argmin}} TSE_{C2}$$

represents a value of $h_2$ when a value of the error function $TSE_{c2}$ is smallest, and $h^*_2$ represents a second filter obtained after an iterative update.

In a possible design, when extracting the first chrominance component of the to-be-processed color image based on the third luminance component by using the first pre-trained filter, the processor is specifically configured to:

extract the first chrominance component of the to-be-processed color image by using the following formula:

$$C_1[n_1,n_2]=[h_1 * f^c{}_{CFA}[n_1,n_2]](-1)^{n_1+n_2}, \text{ where}$$

$C_1[n_1,n_2]$ represents an extracted first chrominance component of a pixel with coordinates $[n_1,n_2]$ in the to-be-processed color image, $h_1$ represents the first filter, and $f^c{}_{CFA}[n_1,n_2]$ represents a color component of the pixel with the coordinates $[n_1,n_2]$ in the to-be-processed color image before extraction is performed.

In a possible design, when extracting the second chrominance component of the to-be-processed color image based on the third luminance component and the extracted first chrominance component by using the second pre-trained filter, the processor is specifically configured to:

extract the second chrominance component of the to-be-processed color image based on a condition shown in the following formula:

$$C_2[n_1,n_2]=[h_2 *(f^c{}_{CFA}[n_1,n_2]-f^c{}_L[n_1,n_2]-h_1 * f^c{}_{CFA}[n_1,n_2]](-1)^{n_1}, \text{ where}$$

$C_2[n_1,n_2]$ represents an extracted second chrominance component of the pixel with the coordinates $[n_1,n_2]$ in the to-be-processed color image, $h_1$ represents the first filter, $f^c{}_{CFA}[n_1,n_2]$ represents the color component of the pixel with the coordinates $[n_1,n_2]$ in the to-be-processed color image before extraction is performed, $h_2$ represents the second filter, and $f^c{}_L[n_1,n_2]$ represents a third luminance component of the pixel with the coordinates $[n_1,n_2]$ in the to-be-processed color image after registration is performed.

In a possible design, when compositing the color output image based on the extracted chrominance component of the to-be-processed color image and the third luminance component, the processor is specifically configured to:

generate, based on conditions shown in the following formulas, the color image corresponding to the to-be-processed color image:

$$R=f_L-C_1-2C_2$$

$$G=f_L+C_1$$

$$B=f_L-C_1+2C_2, \text{ where}$$

R represents a red component of the color image, G represents a green component of the color image, B represents a blue component of the color image, $f_L$ represents the extracted third luminance component of the to-be-processed color image, $C_1$ represents the extracted first chrominance component of the to-be-processed color image, and $C_2$ represents the extracted second chrominance component of the to-be-processed color image.

DESCRIPTION OF EMBODIMENTS

The following further describes in detail the embodiments of this application with reference to accompanying drawings.

Figure 1:
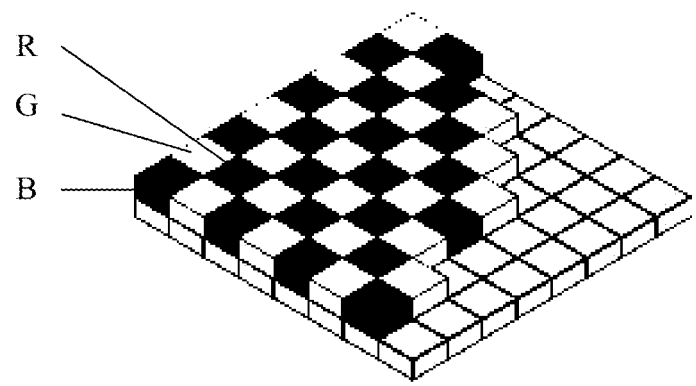
FIG. 1 is a schematic diagram of a Bayer CFA according to an embodiment of this application.

In a process of implementing this application, the applicant finds that in the prior art, a color camera is usually used to photograph an image, and demosaicing is performed on the monochrome image. The color camera uses a monochrome sensor for imaging, and the monochrome sensor uses a Bayer (Bayer) color filter array (CFA) that provides a filter mode in which green elements account for 50%, red elements account for 25%, and blue elements account for 25%, for example, a Bayer color filter array shown in FIG. 1.

Only one of red green blue (RGB) channel signals can be captured at one pixel location. To obtain the other two color channel signals, interpolation needs to be performed in a horizontal or vertical direction for each color channel signal. For example, only a green channel signal can be captured at a pixel location. Therefore, interpolation is performed for the pixel location based on channel signals of surrounding pixel locations, to obtain a blue channel signal and a red channel signal.

Figure 2:
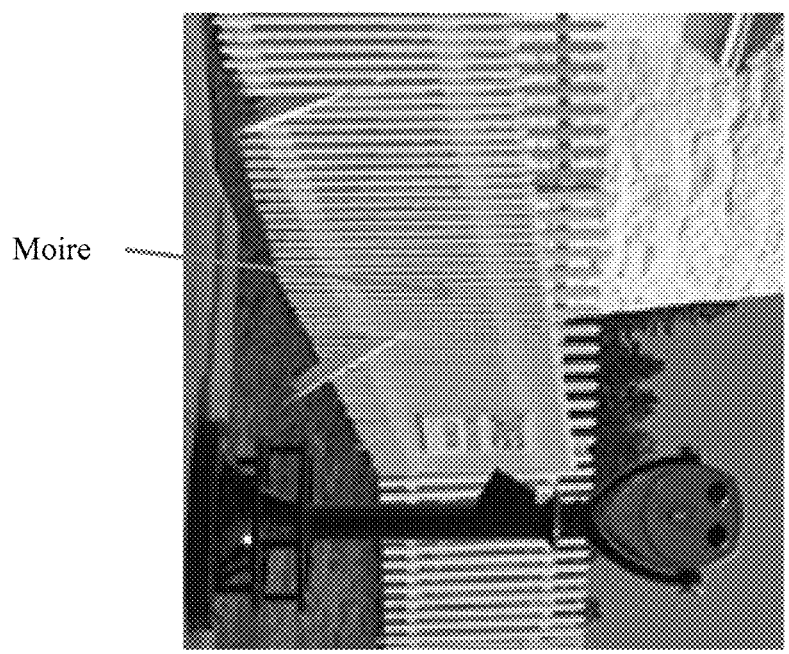
FIG. 2 is a schematic diagram of an image including moire according to an embodiment of this application.

When photographing an image, a single color camera needs to record color information through color separation by using a color filter array, and therefore luminance information is incomplete and less light is admitted. Consequently, moire occurs at a high-frequency region of a composite color image as shown in FIG. 2, and a textureless region of the composite color image is blurred, causing a reduction in image resolution.

The high-frequency region is a region whose frequency exceeds a preset threshold after an image is transformed into frequency domain. Generally, a pattern arranged according to a preset rule, for example, an arrangement pattern of a railing (or fence) in daily life shown in FIG. 2, or an arrangement pattern of tiles on a roof, has relatively high frequency.

On this basis, the embodiments of this application provide a demosaicing method and apparatus, to resolve a prior-art problem that image resolution is reduced. The method and apparatus are based on a same inventive concept. Because a problem-resolving principle of the method is similar to that of the apparatus, mutual reference may be made between apparatus implementation and method implementation. No repeated description is provided.

Some terms in this application are explained below to facilitate understanding by a person skilled in the art.

A color filter array (English: Color Filter Array, CFA for short) may also be referred to as a Bayer (Bayer) format image. An image arranged based on the color filter array includes a plurality of green (G), blue (B), and red (R) pixels, green pixels account for 50%, and blue pixels and red pixels each account for 25%.

A color camera may be configured to photograph a dynamic or static color image by using a conventional RGB sensor.

A monochrome camera may be configured to: by using a monochrome sensor, photograph a dynamic or static monochrome image, and collect luminance information of the image. Resolution of the color camera may be the same as or may be different from that of the monochrome camera. This is not specifically limited in the embodiments of this application.

"A plurality of" means "two or more".

In addition, it should be understood that in the description of this application, the words "first", "second", and the like are merely used for distinction description, and shall not be understood as an indication or implication of relative importance or an indication or implication of an order.

Figure 3A:
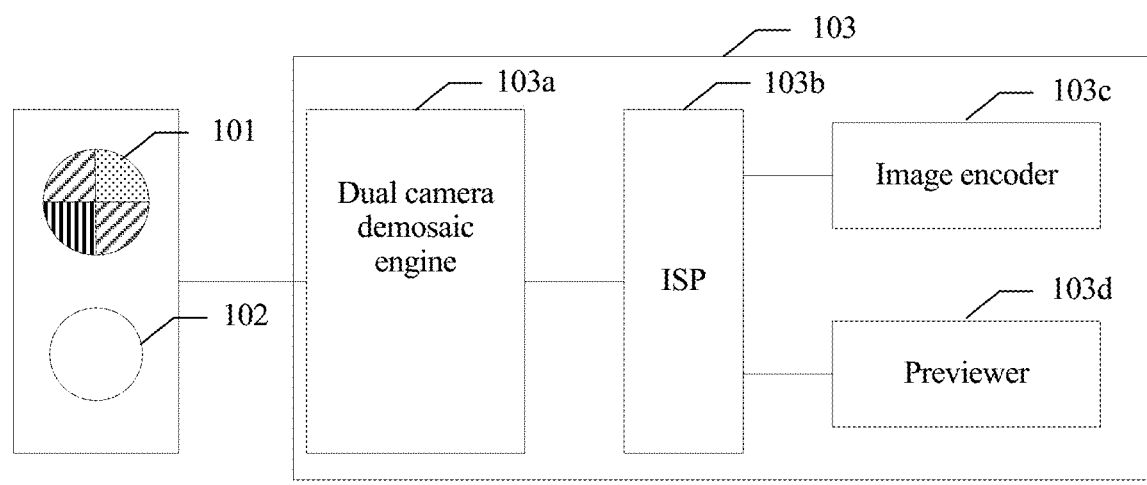
FIG. 3A is a schematic diagram of an electronic device according to an embodiment of this application.

The demosaicing solution in the embodiments of this application may be implemented by an electronic device that can be used for photographing and that includes a color camera and a monochrome camera. The electronic device includes but is not limited to a camera, a personal computer, a server computer, a handheld or laptop device, a mobile device (for example, a mobile phone, a tablet computer, a personal digital assistant, or a media player), a consumer electronic device, a small computer, a mainframe computer, and the like. As shown in FIG. 3A, an electronic device used in an embodiment of the present invention includes a color camera 101, a monochrome camera 102, and a processor 103. The processor 103 is configured to process an image, and may include a dual camera demosaic engine (Dual Camera Demosaic Engine) 103a, an image processor 103b, an image encoder 103c, a previewer (Previewer), and the like. The dual camera demosaic engine 103a is configured to perform related operations, to implement the technical solutions provided in the embodiments of this application. The image processor 103b is configured to perform post processing on a signal that is output by the dual camera demosaic engine 103a, and has main functions such as linear correction, noise removal, defect pixel removal, interpolation, white balance, and automatic exposure control. The image encoder 103c is configured to encode an image signal that is output by the image processor 103b. The previewer is configured to preview the image signal that is output by the image processor. The electronic device may further include other devices, and the other devices are not listed one by one herein.

The solutions provided in the embodiments of this application are described in detail below by using an example in which the electronic device is an intelligent mobile terminal.

Figure 3B:
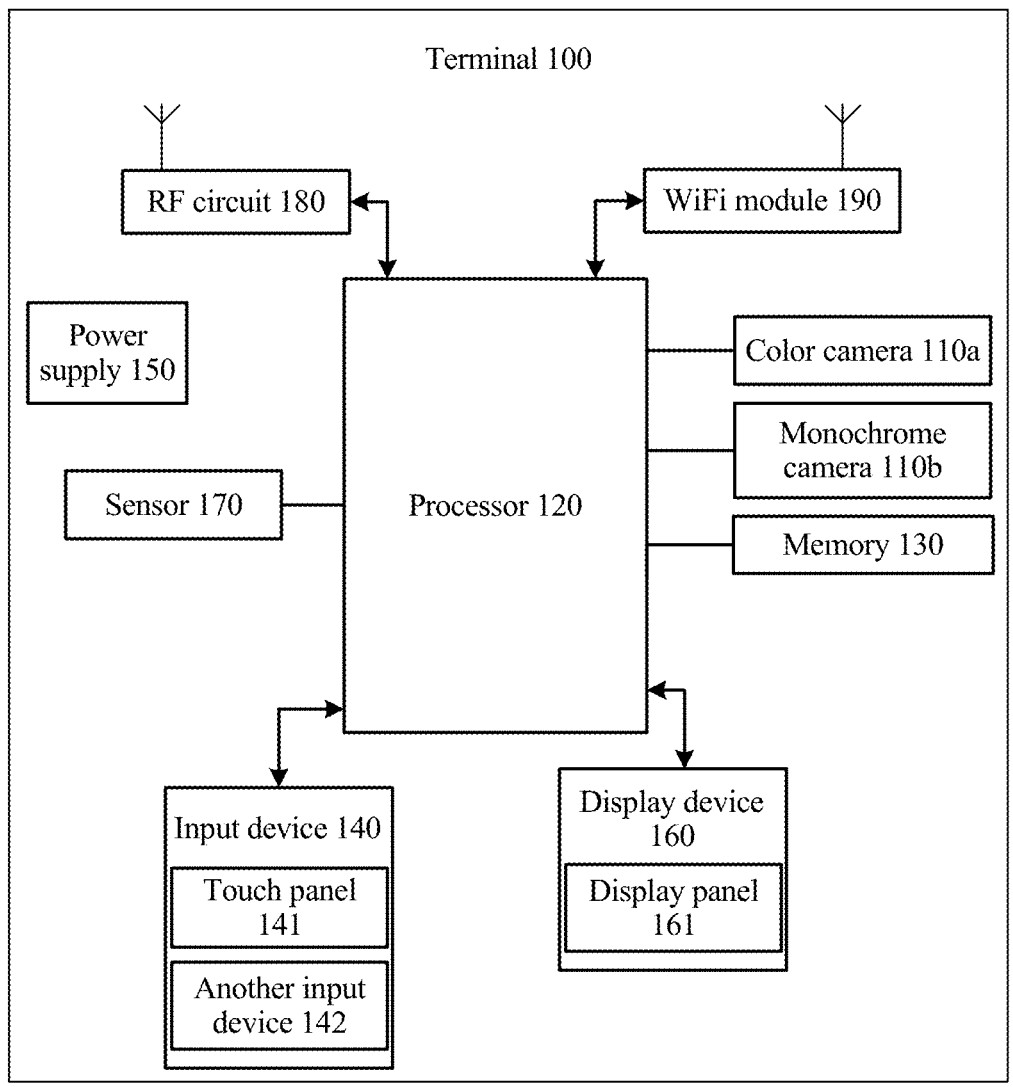
FIG. 3B is a schematic diagram of a terminal device according to an embodiment of this application.
Figure 3C:
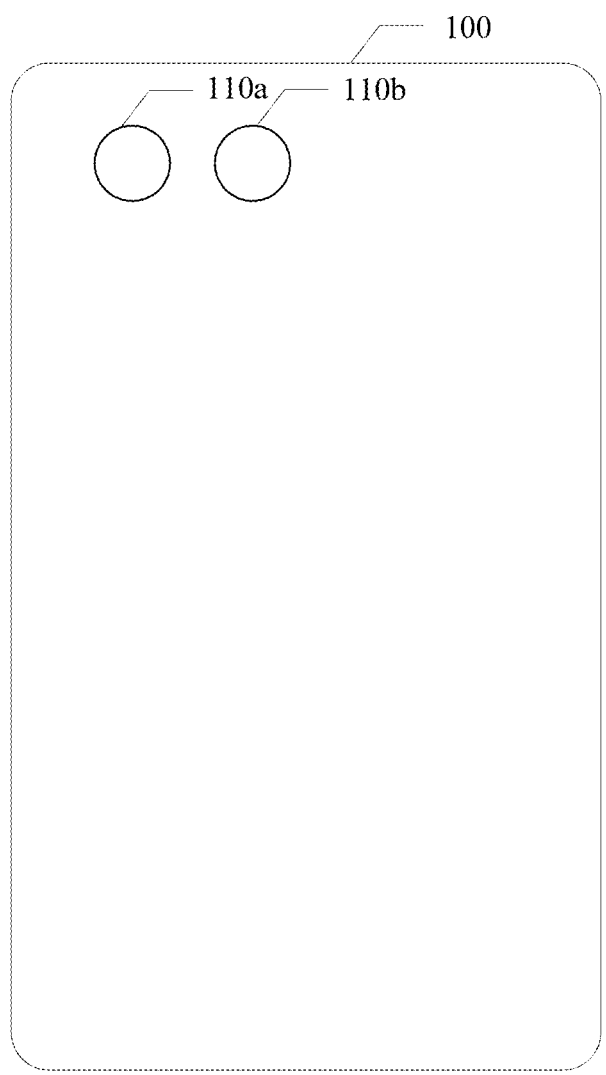
FIG. 3C is a schematic diagram of a terminal device including two cameras according to an embodiment of this application.
Figure 3D:
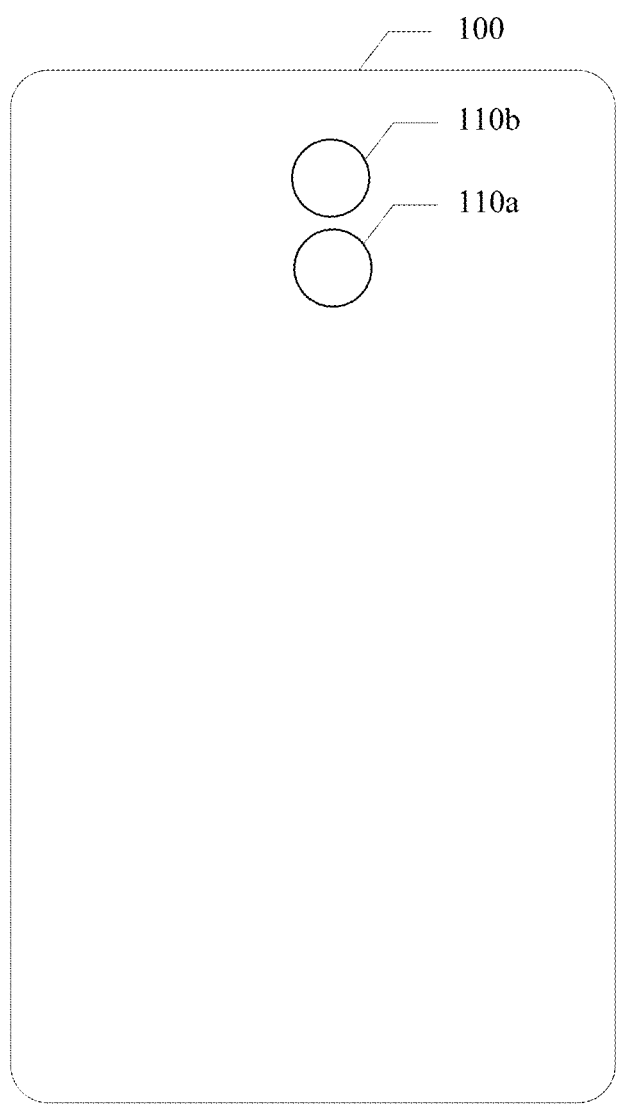
FIG. 3D is a schematic diagram of another terminal device including two cameras according to an embodiment of this application.

Referring to FIG. 3B, FIG. 3B is a schematic diagram of a hardware structure of a terminal applied to an embodiment of this application. As shown in FIG. 3B, a terminal 100 includes a color camera 110a, a monochrome camera 110b, a processor 120, and a memory 130. For example, as shown in FIG. 3C or FIG. 3D, the color camera 110a and the monochrome camera 110b can be disposed in parallel in the electronic device. The memory 130 may be configured to store a software program and data. The processor 120 runs the software program and the data that are stored in the memory 130, to perform various function applications of the terminal 100 and process data. The memory 130 may mainly include a program storage area and a data storage area. The program storage area may store an operating system, an application program required by at least one function (such as an image demosaicing function and an image display function), and the like. The data storage area may store data (such as audio data or a phonebook) created based on use of the terminal 100, and the like. In addition, the memory 130 may include a high-speed random access memory, or may include a nonvolatile memory such as at least one magnetic disk storage device, a flash storage device, or another volatile solid-state storage device. The processor 120 is a control center of the terminal 100, and is connected to all parts of the entire terminal by using various interfaces and lines. The processor 120 runs or executes the software program and/or the data that are/is stored in the memory 130, to perform various functions of the terminal 100 and processes data, thereby performing overall monitoring on the terminal. The processor 120 may include one or more general purpose processors, and may further include one or more digital signal processors (English: Digital Signal Processor, DSP for short), an image processor (English: Image Signal Processor, ISP for short), an image encoder, a previewer, and the like; and is configured to perform related operations, to implement the technical solutions provided in the embodiments of this application. Optionally, a dual camera demosaic engine (Dual Camera Demosaic Engine) may be integrated into the processor 120.

The terminal 100 may further include an input device 140, configured to: receive input digital information or character information or a contact touch operation/non-contact gesture, generate signal input that is related to user settings and function control of the terminal 100, and the like. Specifically, in this embodiment of this application, the input device 140 may include a touch panel 141. The touch panel 141 is also referred to as a touchscreen, and may collect a touch operation of a user on or near the touch panel 141 (for example, an operation performed by the user on the touch panel 141 or near the touch panel 141 by using any appropriate object or accessory such as a finger or a stylus), and drive a corresponding connection apparatus based on a preset program. Optionally, the touch panel 141 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and sends the touch point coordinates to the processor 120; and can receive and execute a command sent by the processor 120. For example, the user taps an image thumbnail on the touch panel 141 with a finger. The touch detection apparatus detects a signal brought by this tap, and then transmits the signal to the touch controller. The touch controller converts the signal into coordinates and sends the coordinates to the processor 120. The processor 120 determines, based on the coordinates and a type (tap or double tap) of the signal, an operation (such as image magnification or full-screen image display) performed on the image, and then determines memory space that needs to be occupied for performing the operation. If the memory space that needs to be occupied is smaller than idle memory, a magnified image is displayed in full screen on a display panel 111 included in a display device, thereby implementing image display.

The touch panel 141 may be implemented in a plurality of types, such as resistance, capacitance, infrared, and a surface acoustic wave. In addition to the touch panel 141, the input device 140 may further include another input device 142. The another input device 142 may include but is not limited to one or more of a physical keyboard, a function key (such as a volume control key or an on/off key), a trackball, a mouse, a joystick, and the like.

The display panel 161 included in the display device 160 is configured to display information that is input by the user or information provided for the user, various menu interfaces of the terminal device 100, and the like. In this embodiment of this application, the display panel 161 is mainly configured to display an image in the terminal 100. Optionally, the display panel 1611 may be configured in a form of a liquid crystal display (English: Liquid Crystal Display, LCD for short), an organic light-emitting diode (English: Organic Light-Emitting Diode, OLED for short), or the like. In some other embodiments, the touch panel 141 may cover the display panel 161, to constitute a touch display screen. The display device may also be referred to as a screen.

In addition to the foregoing parts, the terminal 100 may further include a power supply 150 configured to supply power to other modules. The terminal 100 may further include one or more sensors 170 such as an acceleration sensor or an optical sensor. The terminal 100 may further include a radio frequency (Radio Frequency, RF) circuit 180, configured to perform network communication with a wireless network device, and may further include a WiFi module 190, configured to perform WiFi communication with another device.

Figure 4:
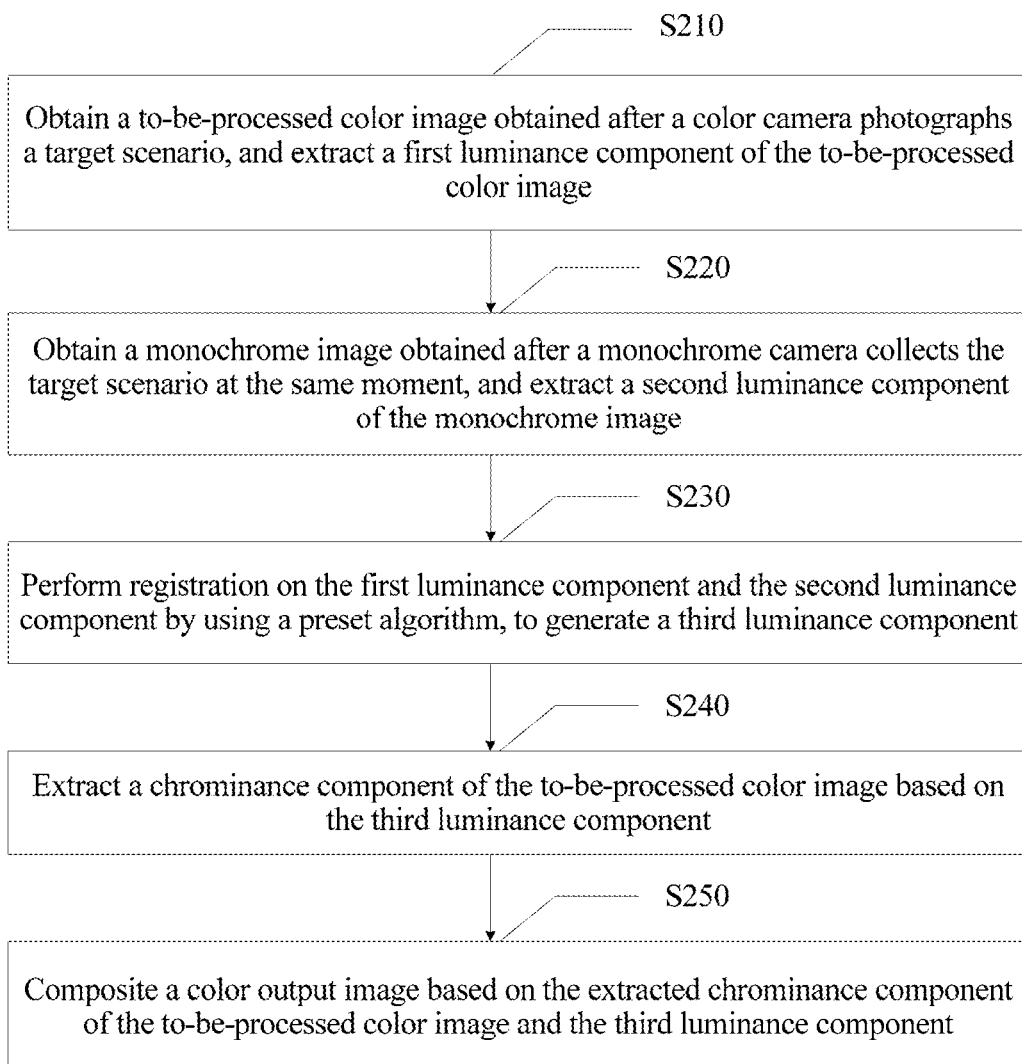
FIG. 4 is a flowchart of a demosaicing method according to an embodiment of this application.

The demosaicing method provided in the embodiments of this application may be implemented in the stored software program shown in FIG. 3B, and may be specifically performed by an electronic device, for example, performed by the processor 120 of the terminal device 100. The electronic device includes a color camera and a monochrome camera, and the color camera and the monochrome camera are disposed in parallel in the electronic device. Specifically, FIG. 4 shows a demosaicing method according to an embodiment of this application. The method specifically includes the following steps.

S210. Obtain a to-be-processed color image obtained after the color camera photographs a target scenario, and extract a first luminance component of the to-be-processed color image.

The luminance component of the to-be-processed color image may be extracted by using an existing method. This is not specifically limited herein in this embodiment of this application. The to-be-processed color image is an image arranged based on a CFA.

S220. Obtain a monochrome image obtained after the monochrome camera collects the target scenario at the same moment, and extract a second luminance component of the monochrome image.

S230. Perform registration on the first luminance component and the second luminance component by using a preset algorithm, to generate a third luminance component.

The preset algorithm may be an optical flow algorithm, a fast matching algorithm, a feature matching algorithm, or the like. This is not specifically limited in the present invention.

S240. Extract a chrominance component of the to-be-processed color image based on the third luminance component.

Specifically, the chrominance component of the to-be-processed color image may include a first chrominance component and a second chrominance component. In this case, during extraction, the first chrominance component of the to-be-processed color image is extracted by using a first pre-trained filter, and the second chrominance component of the to-be-processed color image is extracted based on the third luminance component and the extracted first chrominance component by using a second pre-trained filter.

S250. Composite a color output image based on the extracted chrominance component of the to-be-processed color image and the third luminance component.

Specifically, the color image corresponding to the to-be-processed color image is generated based on the extracted first chrominance component and second chrominance component of the to-be-processed color image and the third luminance component.

When photographing an image, a single color camera needs to record color information through color separation by using a color filter array, and therefore luminance information is incomplete and less light is admitted. However, a monochrome camera does not need to record color information through color separation. In this case, light admitted in the monochrome camera is far more than light admitted in the color camera, and luminance information obtained by the monochrome camera is far truer and more effective than luminance obtained by the color camera. Therefore, the luminance information collected by the monochrome camera is used to instruct the color camera to perform demosaicing, so that a true luminance signal and a true chrominance signal of a color image can be obtained through resolution from an aliasing spectrum, to restore a true color image, thereby improving resolution.

In a possible implementation, the first filter and the second filter may be trained by using an image collected by a high-quality single-lens reflex camera, because the image photographed by the single-lens reflex camera is relatively true and effective. The first filter and the second filter may be trained in the following manner:

A1. Obtain an image training set, where the image training set includes K first images, and each pixel in each first image includes a red R component, a green G component, and a blue B component.

The K first images may be natural scenery images collected by the high-quality single-lens reflex camera.

A2. Generate an $i^{th}$ CFA image that is corresponding to an $i^{th}$ first image and that is arranged based on a color filter array CFA.

A3. Convert, based on the $i^{th}$ CFA image, the $i^{th}$ first image into an $i^{th}$ second image whose pixel includes one luminance component, a first chrominance component, and a second chrominance component, where i is any positive integer not greater than K.

Optionally, the $i^{th}$ second image meets conditions shown in the following formulas:

$$f'_L[n_1,n_2] = \tfrac{1}{4} f'_R[n_1,n_2] + \tfrac{1}{2} f'_G[n_1,n_2] + \tfrac{1}{4} f'_B[n_1,n_2]$$

$$f'_{c1m}[n_1,n_2] = (-\tfrac{1}{4} f'_R[n_1,n_2] + \tfrac{1}{2} f'_G[n_1,n_2] - \tfrac{1}{4} f'_B[n_1,n_2])(-1)^{n_1+n_2}$$

$$f'_{c2m}[n_1,n_2] = f'_{CFA}[n_1,n_2] - f'_L[n_1,n_2] - f'_{c1m}[n_1,n_2],$$

where $f'_L[n_1,n_2]$ represents a luminance component of a pixel with coordinates $[n_1,n_2]$ in the $i^{th}$ second image, $f'_{c1m}[n_1,n_2]$ represents a first chrominance component of the pixel with the coordinates $[n_1,n_2]$ in the $i^{th}$ second image, $f'_{c2m}[n_1,n_2]$ represents a second chrominance component of the pixel with the coordinates $[n_1,n_2]$ in the $i^{th}$ second image, $f'_R[n_1,n_2]$ represents an R component of a pixel with coordinates $[n_1,n_2]$ in the $i^{th}$ first image, $f'_G[n_1,n_2]$ represents a G component of the pixel with the coordinates $[n_1,n_2]$ in the $i^{th}$ first image, $f'_B[n_1,n_2]$ represents a B component of the pixel with the coordinates $[n_1,n_2]$ in the $i^{th}$ first image, $f'_{CFA}[n_1,n_2]$ represents a pixel value of a pixel with coordinates $[n_1,n_2]$ in the $i^{th}$ CFA image, $n_1$ represents a horizontal pixel location in an image, and $n_2$ represents a vertical pixel location in the image.

Assuming that a size of the image is 256×256, both $n_1$ and $n_2$ are 256.

A4. Input K CFA images to an initialized first filter for iterative processing.

A5. After an $i^{th}$ iteration, obtain an error between a first chrominance component included in the $i^{th}$ second image that is input to the first filter during the $i^{th}$ iteration and a first chrominance component obtained after the $i^{th}$ iterative processing.

A6. Adjust a parameter value in a filtering window of the first filter in an $(i+1)^{th}$ iteration process based on the error.

A size of the filtering window of the first filter is B. For example, if B is a 5×5 array, the filtering window includes 25 parameter values.

Specifically, the first filter meets conditions shown in the following formulas:

$$\hat{f}^i_{c1m} = \sum_{[k_1,k_2] \in B} h_1[k_1,k_2] f^i_{CFA}[n_1-k_1, n_2-k_2]$$

$$TSE_{c1} = \sum_{i=1}^{K} \sum_{[n_1,n_2] \in A_i} \left(\hat{f}^i_{c1m}[n_1,n_2] - f^i_{c1m}[n_1,n_2]\right)^2$$

$$h_1^* = \operatorname*{argmin}_{h_1} TSE_{C1},$$

where
$h_1[k_1,k_2]$ represents a parameter with coordinates $[k_1,k_2]$ in the filtering window of the first filter, B represents a size of the filtering window of the first filter, $f^i_{CFA}[n_1-k_1,n_2-k_2]$ represents a pixel value of a pixel with coordinates $[n_1-k_1, n_2-k_2]$ in the $i^{th}$ CFA image, $\hat{f}^i_{c1m}[n_1,n_2]$ represents the first chrominance component of the $i^{th}$ second image, $\hat{f}^i_{c1m}[n_1,n_2]$ represents a first chrominance component obtained after the $i^{th}$ CFA image is input to the first filter, $A_i$ represents a size of the $i^{th}$ CFA image, $TSE_{c1}$ represents an error function corresponding to the first chrominance component, $$\operatorname*{argmin}_{h_1} TSE_{C1}$$

represents a value of $h_1$ when a value of the error function is smallest, and $h^*_1$ represents a first filter obtained after an iterative update.

After the steps A1 to A3, the second filter is trained based on generated second images in the following manner:

B1. Input CFA images corresponding to the K first images to an initialized second filter for iterative processing.

B2. After an $i^{th}$ iteration, obtain an error between a second chrominance component included in the $i^{th}$ second image that is input to the second filter during the $i^{th}$ iteration and a second chrominance component obtained after the $i^{th}$ iterative processing.

B3. Adjust a parameter value in a filtering window of the second filter in an $(i+1)^{th}$ iteration process based on the error.

Specifically, the second filter meets conditions shown in the following formulas:

$$g^i_{CFA} = f^i_{CFA} - f^i_{c1m} - f^i_L$$

$$\hat{f}^i_{c2m} = \sum_{[l_1,l_2] \in D} h_2[l_1,l_2] g^i_{CFA}[n_1-l_1, n_2-l_2]$$

$$TSE_{c2} = \sum_{i=1}^{K} \sum_{[n_1,n_2] \in A_i} \left(\hat{f}^i_{c2m}[n_1,n_2] - f^i_{c2m}[n_1,n_2]\right)^2$$

$$h_2^* = \operatorname*{argmin}_{h_2} TSE_{C2},$$

where
$h_2[l_1,l_2]$ represents a parameter with coordinates $[l_1,l_2]$ in the filtering window of the second filter, D represents a size of the filtering window of the second filter, $f^i_{CFA}$ represents the $i^{th}$ CFA image, $f^i_{c1m}[n_1,n_2]$ represents the first chrominance component of the $i^{th}$ second image, $f^i_L$ represents a luminance component of the $i^{th}$ second image, $A_i$ represents the size of the $i^{th}$ CFA image, $TSE_{c2}$ represents an error function corresponding to the second chrominance component, $$\operatorname*{argmin}_{h_2} TSE_{C2}$$

represents a value of $h_2$ when a value of the error function $TSE_{c2}$ is smallest, and $h^*_2$ represents a second filter obtained after an iterative update.

In step S240, extracting the first chrominance component of the to-be-processed color image by using the first pre-trained filter can be implemented in the following manner:
extracting the first chrominance component of the to-be-processed color image by using the following formula:

$$C_1[n_1,n_2] = [h_1^* * f^c_{CFA}[n_1,n_2]](-1)^{n_1+n_2}, \text{ where}$$

$C_1[n_1,n_2]$ represents an extracted first chrominance component of a pixel with coordinates $[n_1,n_2]$ in the to-be-processed color image, $h_1$ represents the first filter, and $f^c_{CFA}[n_1,n_2]$ represents a color component of the pixel with the coordinates $[n_1,n_2]$ in the to-be-processed color image before extraction is performed.

In the foregoing manner, the first chrominance component without aliasing can be restored from the to-be-processed color image.

Extracting the second chrominance component of the to-be-processed color image based on the third luminance component and the extracted first chrominance component by using the second pre-trained filter can be implemented in the following manner:
extracting the second chrominance component of the to-be-processed color image based on a condition shown in the following formula:

$$C_2[n_1,n_2] = [h_2^* * (f^c_{CFA}[n_1,n_2] - f^c_L[n_1,n_2] - h_1^* * f^c_{CFA}[n_1,n_2])](-1)^{n_1}, \text{ where}$$

$C_2[n_1,n_2]$ represents an extracted second chrominance component of the pixel with the coordinates $[n_1,n_2]$ in the to-be-processed color image, $h_1$ represents the first filter, $f^c_{CFA}[n_1,n_2]$ represents the color component of the pixel with the coordinates $[n_1,n_2]$ in the to-be-processed color image before extraction is performed, $h_2$ represents the second filter, and $f^c_{CFA}[n_1,n_2]$ represents a third luminance component of the pixel with the coordinates $[n_1,n_2]$ in the to-be-processed color image after registration is performed.

In the foregoing manner, the second chrominance component without aliasing can be restored from the to-be-processed color image.

Optionally, generating, based on the extracted first chrominance component and second chrominance component of the to-be-processed color image and the third luminance component, the color image corresponding to the to-be-processed color image can be implemented in the following manner:
generating, based on conditions shown in the following formulas, the color image corresponding to the to-be-processed color image:

$R = f_L - C_1 - 2C_2$ $G = f_L + C_1$ $B = f_L - C_1 + 2C_2$, where

R represents a red component of the color image, G represents a green component of the color image, B represents a blue component of the color image, $f_L$ represents the extracted third luminance component of the to-be-processed color image, $C_1$ represents the extracted first chrominance component of the to-be-processed color image, and $C_2$ represents the extracted second chrominance component of the to-be-processed color image.

The RGB color image generated in the foregoing manner can overcome, to a maximum extent, a prior-art problem that aliasing occurs in a color image generated based on an image photographed by using a single camera.

Figure 5A:
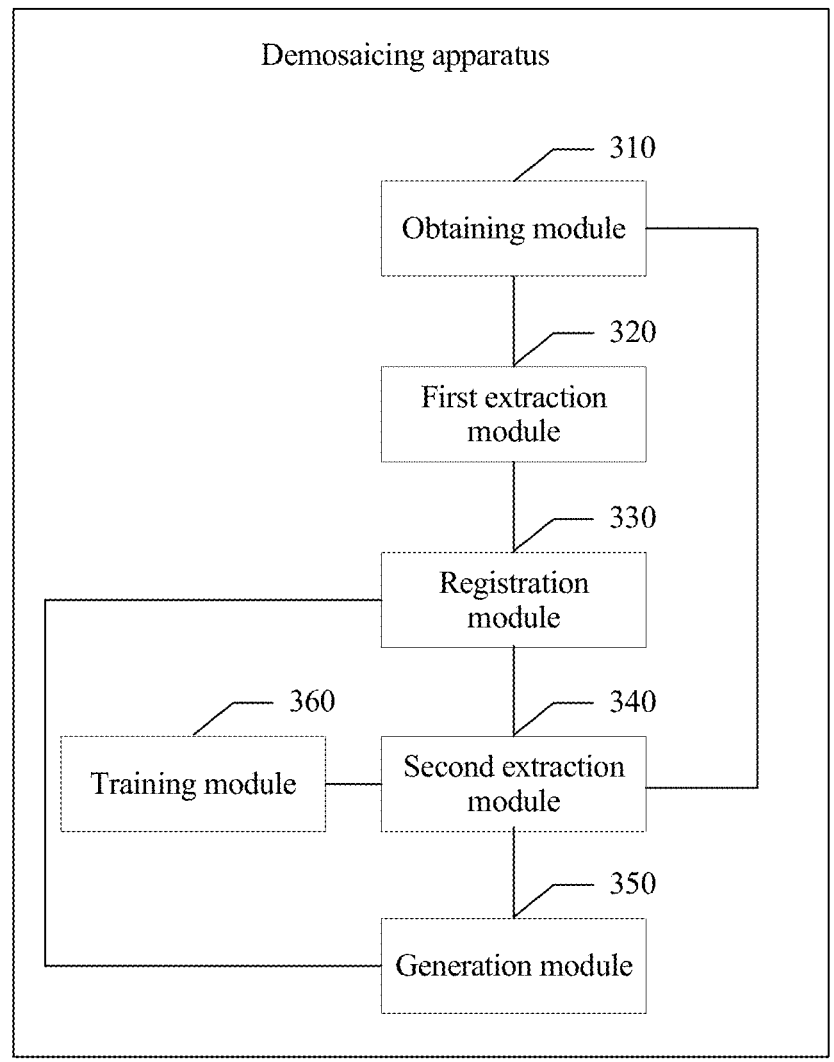
FIG. 5A is a schematic diagram of a demosaicing apparatus according to an embodiment of this application.
Figure 5B:
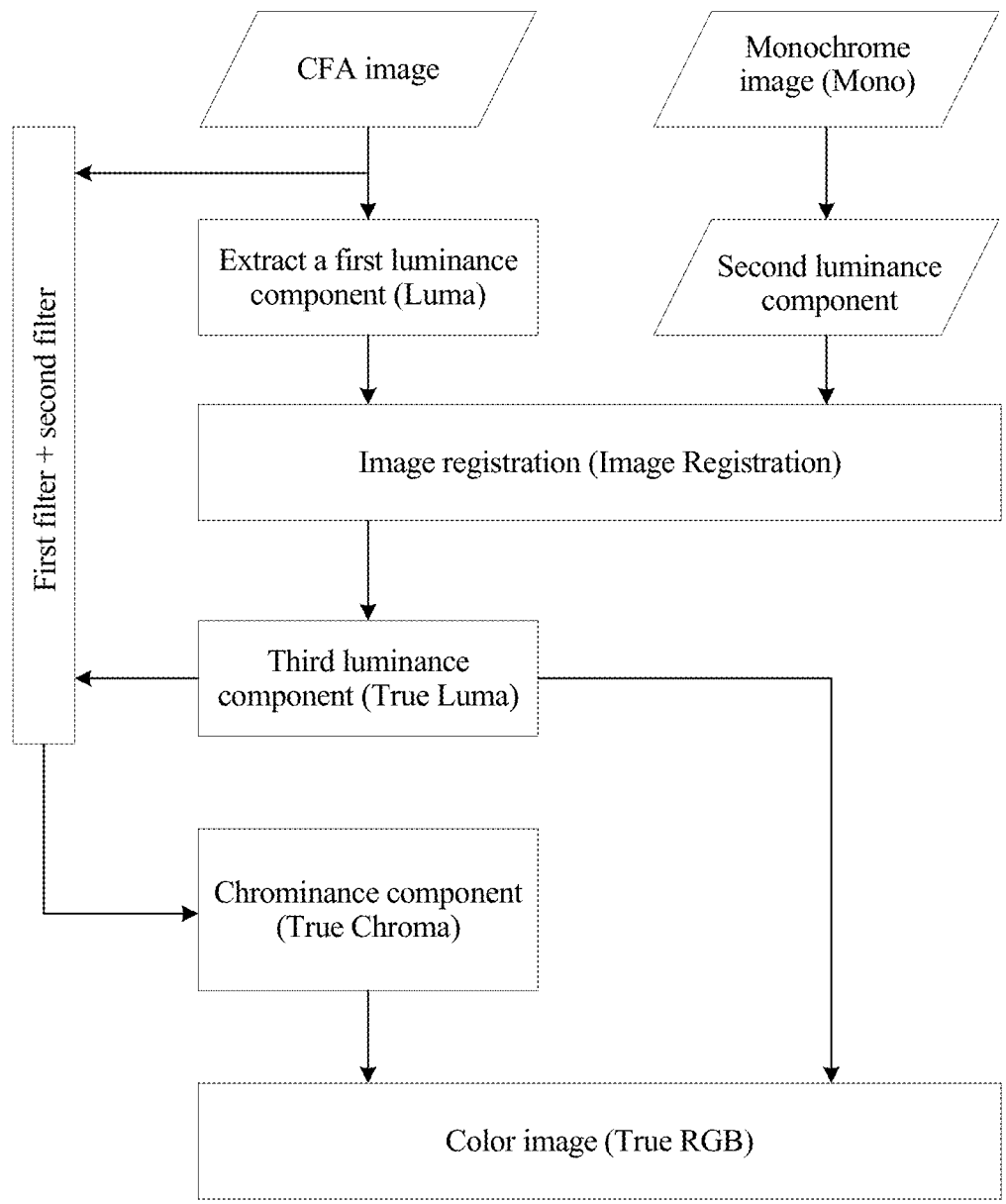
FIG. 5B is a schematic diagram of a demosaicing method according to an embodiment of this application.

Based on a same inventive concept of the method embodiment, an embodiment of the present invention further provides a demosaicing apparatus, and the apparatus is applied to an electronic device that includes a color camera and a monochrome camera. As shown in FIG. 5A and FIG. 5B, FIG. 5A is a schematic diagram of the apparatus, and FIG. 5B is a schematic diagram of a signal change procedure. The apparatus includes: an obtaining module 310, a first extraction module 320, a registration module 330, a second extraction module 340, and a generation module 350.

The obtaining module 310 is configured to: obtain a to-be-processed color image obtained after the color camera photographs a target scenario, and obtain a monochrome image obtained after the monochrome camera collects the target scenario at the same moment. The monochrome image may be briefly referred to as mono, and the monochrome image includes only a luminance component.

The first extraction module 320 is configured to: extract a luma signal, and obtain a luminance signal included in the monochrome image. Specifically, the extraction module 320 is configured to: extract a first luminance component of the to-be-processed color image obtained by the obtaining module, and extract a second luminance component of the monochrome image. The first luminance component may be referred to as luma.

The registration module 330 is configured to perform image registration (Image Registration), and is specifically configured to perform registration on the first luminance component and the second luminance component by using a preset algorithm, to generate a third luminance component.

The luminance component included in the monochrome image photographed by the monochrome camera is used to instruct to obtain the luminance component. Because luminance information included in the monochrome image is better than luminance information in the color image, it is determined that obtained third luminance information is truer and more accurate than that obtained in the prior art. Therefore, it can be considered that the third luminance component is a true luminance component (True Luma) of the image.

The second extraction module 340 is configured to extract a chrominance component of the to-be-processed color image based on the third luminance component. Because the luminance component is truer, the chrominance component extracted based on the true luminance component is truer and more accurate. Therefore, it can be considered that the chrominance component is a true chrominance component (True Chroma) of the image.

Specifically, the second extraction module extracts a first chrominance component of the to-be-processed color image by using a first pre-trained filter, and extracts a second chrominance component of the to-be-processed color image based on the third luminance component and the extracted first chrominance component by using a second pre-trained filter.

The generation module 350 is configured to composite a color output image based on the extracted chrominance component of the to-be-processed color image and the third luminance component. The color output image is a true RGB image (True RGB) that can be presented.

Figure 6:
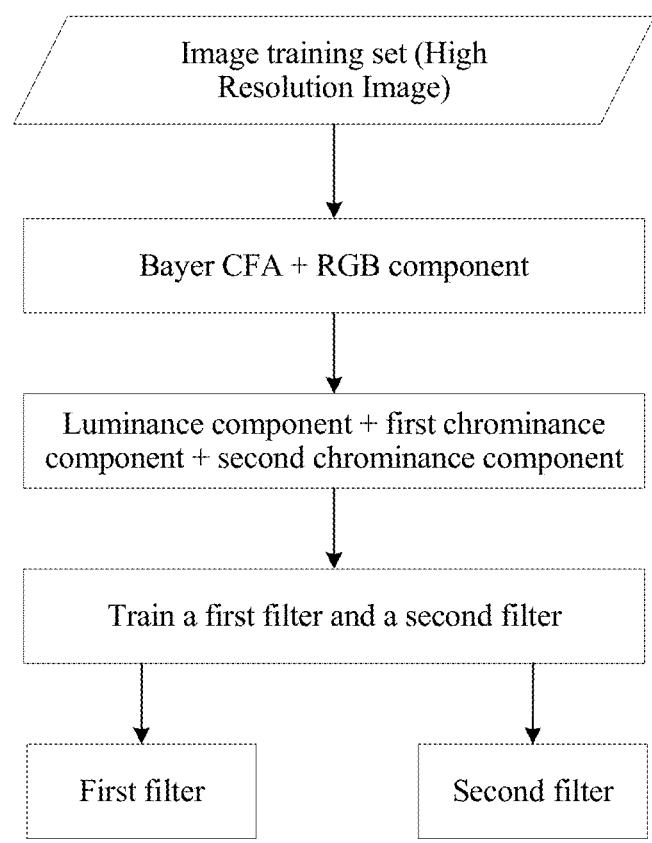
FIG. 6 is a schematic diagram of a method for training a first filter and a second filter according to an embodiment of this application.

In a possible design, the apparatus may further include a training module 360. The training module 360 is configured to train the first filter in the following manner. Referring to FIG. 6, FIG. 6 is a schematic diagram of a signal change procedure in a training process.

C1. Obtain an image training set, where the image training set includes K first images, and each pixel in each first image includes a red R component, a green G component, and a blue B component.

The K first images included in the image training set are all high resolution images (high resolution Image), and may be specifically photographed by a high-quality single-lens reflex camera.

C2. Generate a Bayer CFA corresponding to each image, and obtain an RGB component included in each image.

Specifically, an $i^{th}$ CFA image that is corresponding to an $i^{th}$ first image and that is arranged based on a color filter array CFA is generated.

The $i^{th}$ first image is converted, based on the $i^{th}$ CFA image, into an $i^{th}$ second image whose pixel includes one luminance component, a first chrominance component, and a second chrominance component, where i is any positive integer not greater than K.

C3. Train the first filter and the second filter.

The first filter may be specifically trained in the following manner:

inputting K CFA images to an initialized first filter for iterative processing; after an $i^{th}$ iteration, obtaining an error between a first chrominance component included in the $i^{th}$ second image that is input to the first filter during the $i^{th}$ iteration and a first chrominance component obtained after the $i^{th}$ iterative processing; and adjusting a parameter value in a filtering window of the first filter in an $(i+1)^{th}$ iteration process based on the error.

Optionally, the $i^{th}$ second image meets conditions shown in the following formulas:

$$f'_L[n_1,n_2] = \tfrac{1}{4} f'_R[n_1,n_2] + \tfrac{1}{2} f'_G[n_1,n_2] + \tfrac{1}{4} f'_B[n_1,n_2]$$

$$f'_{c1m}[n_1,n_2] = (-\tfrac{1}{4} f'_R[n_1,n_2] + \tfrac{1}{2} f'_G[n_1,n_2] - \tfrac{1}{4} f'_B[n_1,n_2])(-1)^{n_1+n_2}$$

$$f'_{c2m}[n_1,n_2] = f'_{CFA}[n_1,n_2] - f'_L[n_1,n_2] - f'_{c1m}[n_1,n_2],$$
where $f'_L[n_1,n_2]$ represents a luminance component of a pixel with coordinates $[n_1,n_2]$ in the $i^{th}$ second image, $f'_{c1m}[n_1,n_2]$ represents a first chrominance component of the pixel with the coordinates $[n_1,n_2]$ in the $i^{th}$ second image, $f'_{c2m}[n_1,n_2]$ represents a second chrominance component of the pixel with the coordinates $[n_1,n_2]$ in the $i^{th}$ second image, $f'_R[n_1,n_2]$ represents an R component of a pixel with coordinates $[n_1,n_2]$ in the $i^{th}$ first image, $f'_G[n_1,n_2]$ represents a G component of the pixel with the coordinates $[n_1,n_2]$ in the $i^{th}$ first image, $f'_B[n_1,n_2]$ represents a B component of the pixel with the coordinates $[n_1,n_2]$ in the $i^{th}$ first image, $f'_{CFA}[n_1,n_2]$ represents a pixel value of a pixel with coordinates $[n_1,n_2]$ in the $i^{th}$ CFA image, $n_1$ represents a horizontal pixel location in an image, and $n_2$ represents a vertical pixel location in the image.

The first filter meets conditions shown in the following formulas:

$$\hat{f}^i_{c1m} = \sum_{[k_1,k_2]\in B} h_1[k_1, k_2] f^i_{CFA}[n_1 - k_1, n_2 - k_2]$$

$$TSE_{c1} = \sum_{i=1}^{K} \sum_{[n_1,n_2]\in A_i} \left(\hat{f}^i_{c1m}[n_1, n_2] - f^i_{c1m}[n_1, n_2]\right)^2$$

$$h_1^* = \underset{h_1}{\mathrm{argmin}} TSE_{C1},$$

where $h_1[k_1,k_2]$ represents a parameter with coordinates $[k_1,k_2]$ in the filtering window of the first filter, B represents a size of the filtering window of the first filter, $f^i_{CFA}[n_1-k_1,n_2-k_2]$ represents a pixel value of a pixel with coordinates $[n_1-k_1, n_2-k_2]$ in the $i^{th}$ CFA image, $f^i_{c1m}[n_1,n_2]$ represents the first chrominance component of the $i^{th}$ second image, $\hat{f}^i_{c1m}[n_1,n_2]$ represents a first chrominance component obtained after the $i^{th}$ CFA image is input to the first filter, $A_i$ represents a size of the $i^{th}$ CFA image, $TSE_{c1}$ represents an error function corresponding to the first chrominance component, $$\underset{h_1}{\mathrm{argmin}} TSE_{C1}$$

represents a value of $h_1$ when a value of the error function is smallest, and $h^*_1$ represents a first filter obtained after an iterative update.

The training module 360 may specifically train the second filter in the following manner:

inputting CFA images corresponding to the K first images to an initialized second filter for iterative processing; after an $i^{th}$ iteration, obtaining an error between a second chrominance component included in the $i^{th}$ second image that is input to the second filter during the $i^{th}$ iteration and a second chrominance component obtained after the $i^{th}$ iterative processing; and adjusting a parameter value in a filtering window of the second filter in an $(i+1)^{th}$ iteration process based on the error.

Optionally, the second filter meets conditions shown in the following formulas:

$$g^i_{CFA} = f^i_{CFA} - f^i_{c1m} - f^i_L$$

$$\hat{f}^i_{c2m} = \sum_{[l_1,l_2]\in D} h_2[l_1, l_2] g^i_{CFA}[n_1 - l_1, n_2 - l_2]$$

$$TSE_{c2} = \sum_{i=1}^{K} \sum_{[n_1,n_2]\in A_i} \left(\hat{f}^i_{c2m}[n_1, n_2] - f^i_{c2m}[n_1, n_2]\right)^2$$

$$h_2^* = \underset{h_2}{\mathrm{argmin}} TSE_{C2},$$

where $h_2[l_1,l_2]$ represents a parameter with coordinates $[l_1,l_2]$ in the filtering window of the second filter, D represents a size of the filtering window of the second filter, $f^i_{CFA}$ represents the $i^{th}$ CFA image, $f^i_{c1m}[n_1,n_2]$ represents the first chrominance component of the $i^{th}$ second image, $f^i_L$ represents a luminance component of the $i^{th}$ second image, $A_i$ represents the size of the $i^{th}$ CFA image, $TSE_{c2}$ represents an error function corresponding to the second chrominance component, $$\underset{h_2}{\mathrm{argmin}} TSE_{C2}$$

represents a value of $h_2$ when a value of the error function $TSE_{c2}$ is smallest, and $h^*_2$ represents a second filter obtained after an iterative update.

When extracting the first chrominance component of the to-be-processed color image based on the third luminance component by using the first pre-trained filter, the second extraction module 340 is specifically configured to extract the first chrominance component of the to-be-processed color image by using the following formula:

$$C_1[n_1,n_2]=[h_1 * f_{CFA}[n_1,n_2]](-1)^{n_1+n_2}, \text{ where}$$

$C_1[n_1,n_2]$ represents an extracted first chrominance component of a pixel with coordinates $[n_1,n_2]$ in the to-be-processed color image, $h_1$ represents the first filter, and $f_{CFA}[n_1,n^2]$ represents a color component of the pixel with the coordinates $[n_1,n_2]$ in the to-be-processed color image before extraction is performed.

When extracting the second chrominance component of the to-be-processed color image based on the third luminance component and the extracted first chrominance component by using the second pre-trained filter, the second extraction module 340 is specifically configured to extract the second chrominance component of the to-be-processed color image based on a condition shown in the following formula:

$$C_2[n_1,n_2]=[h_2*(f_{CFA}[n_1,n_2]-f_L[n_1,n_2]-h_1*f_{CFA}[n_1,n_2]](-1)^{n_1}, \text{ where}$$

$C_2[n_1,n_2]$ represents an extracted second chrominance component of the pixel with the coordinates $[n_1,n_2]$ in the to-be-processed color image, $h_1$ represents the first filter, $f_{CFA}[n_1,n_2]$ represents the color component of the pixel with the coordinates $[n_1,n_2]$ in the to-be-processed color image before extraction is performed, $h_2$ represents the second filter, and $f_L[n_1,n_2]$ represents a third luminance component of the pixel with the coordinates $[n_1,n_2]$ in the to-be-processed color image after registration is performed.

The generation module 350 is specifically configured to composite the color output image based on conditions shown in the following formulas:

$$R = f_L - C_1 - 2C_2$$

$$G = f_L + C_1$$

$$B = f_L - C_1 + 2C_2, \text{ where}$$

R represents a red component of the color output image, G represents a green component of the color output image, B represents a blue component of the color output image, $f_L$ represents the extracted third luminance component of the to-be-processed color image, $C_1$ represents the extracted first chrominance component of the to-be-processed color image, and $C_2$ represents the extracted second chrominance component of the to-be-processed color image.

It should be noted that module division in the embodiments of this application is an example, and is merely logical function division. There may be other division during actual implementation. Function modules in the embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software function module and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a terminal device, or the like) or a processor (for example, the processor 120 shown in FIG. 3B) to perform all or some of the steps of the method described in the embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk storage, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

These computer program instructions may alternatively be stored in a computer readable memory that can instruct a computer or another programmable data processing device to work in a particular manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to the embodiments of this application without departing from the spirit and scope of the embodiments of this application. In this way, this application is intended to cover these modifications and variations provided that these modifications and variations of the embodiments of this application fall within the scope of the claims of this application and their equivalent technologies.

What is claimed is:

1. A demosaicing method, wherein the method is applied to an electronic device comprising a color camera and a monochrome camera, the color camera and the monochrome camera are disposed in parallel on the electronic device, and the method comprises:
   obtaining a to-be-processed color image by the color camera photographing a target scenario, and extracting a first luminance component of the to-be-processed color image;
   obtaining a monochrome image by the monochrome camera photographing the target scenario at the same moment, and extracting a second luminance component of the monochrome image;
   performing registration on the first luminance component and the second luminance component by using a preset algorithm, to generate a third luminance component;
   extracting a chrominance component of the to-be-processed color image based on the third luminance component, wherein the chrominance component of the to-be-processed color image comprises a first chrominance component and a second chrominance component, and the extracting the chrominance component of the to-be-processed color image based on the third luminance component comprises:
      extracting the first chrominance component of the to-be-processed color image by using a first pre-trained filter; and
      extracting the second chrominance component of the to-be-processed color image based on the third luminance component and the extracted first chrominance component by using a second pre-trained filter; and
   compositing a color output image based on the extracted chrominance component of the to-be-processed color image and the third luminance component.

2. The method according to claim 1, wherein the first filter is trained in the following manner:
   obtaining an image training set, wherein the image training set comprises K first images, and each pixel in each first image comprises a red R component, a green G component, and a blue B component;
   generating an $i^{th}$ CFA image that is corresponding to an $i^{th}$ first image and that is arranged based on a color filter array CFA;
   converting, based on the $i^{th}$ CFA image, the $i^{th}$ first image into an $i^{th}$ second image whose pixel consists of one luminance component, a first chrominance component, and a second chrominance component, wherein i is any positive integer not greater than K;

inputting K CFA images to an initialized first filter for iterative processing;

after an $i^{th}$ iteration, obtaining an error between a first chrominance component comprised in the $i^{th}$ second image that is input to the first filter during the $i^{th}$ iteration and a first chrominance component obtained after the $i^{th}$ iteration; and adjusting a parameter value in a filtering window of the first filter in an $(i+1)^{th}$ iteration process based on the error.

3. The method according to claim 2, wherein the $i^{th}$ second image meets conditions shown in the following formulas:

$$f^i_L[n_1,n_2]=\tfrac{1}{4}f^i_R[n_1,n_2]+\tfrac{1}{2}f^i_G[n_1,n_2]+\tfrac{1}{4}f^i_B[n_1,n_2]$$

$$f^i_{c1m}[n_1,n_2]=(-\tfrac{1}{4}f^i_R[n_1,n_2]+\tfrac{1}{2}f^i_G[n_1,n_2]-\tfrac{1}{4}f^i_B[n_1,n_2])(-1)^{n_1+n_2}$$

$$f^i_{c2m}[n_1,n_2]=f^i_{CFA}[n_1,n_2]-f^i_L[n_1,n_2]-f^i_{c1m}[n_1,n_2],$$

wherein $f^i_L[n_1,n_2]$ represents a luminance component of a pixel with coordinates $[n_1,n_2]$ in the $i^{th}$ second image, $f^i_{c1m}[n_1,n_2]$ represents a first chrominance component of the pixel with the coordinates $[n_1,n_2]$ in the $i^{th}$ second image $f^i_{c2m}[n_1,n_2]$ represents a second chrominance component of the pixel with the coordinates $[n_1,n_2]$ in the $i^{th}$ second image, $f^i_R[n_1,n_2]$ represents an R component of a pixel with coordinates $[n_1,n_2]$ in the $i^{th}$ first image, f represents a G component of the pixel with the coordinates $[n_1,n_2]$ in the $i^{th}$ first image, $f^i_B[n_1,n_2]$ represents a B component of the pixel with the coordinates $[n_1,n_2]$ in the $i^{th}$ first image, $f^i_{CFA}[n_1,n_2]$ represents a pixel value of a pixel with coordinates $[n_1,n_2]$ in the $i^{th}$ CFA image, $n_1$ represents a horizontal pixel location in an image, and $n_2$ represents a vertical pixel location in the image.

4. The method according to claim 2, wherein the first filter meets conditions shown in the following formulas:

$$\hat{f}^i_{c1m} = \sum_{[k_1,k_2]\in B} h_1[k_1,k_2]f^i_{CFA}[n_1-k_1, n_2-k_2]$$

$$TSE_{c1} = \sum_{i=1}^{K}\sum_{[n_1,n_2]\in A_i} \left(\hat{f}^i_{c1m}[n_1,n_2] - f^i_{c1m}[n_1,n_2]\right)^2$$

$$h^*_1 = \operatorname*{argmin}_{h_1} TSE_{C1},$$

wherein $h_1[k_1,k_2]$ represents a parameter with coordinates $[k_1,k_2]$ in the filtering window of the first filter, B represents a size of the filtering window of the first filter, $f^i_{CFA}[n_1-k_1,n_2-k_2]$ represents a pixel value of a pixel with coordinates $[n_1-k_1,n_2-k_2]$ in the $i^{th}$ CFA image $f^i_{c1m}[n_1,n_2]$ represents the first chrominance component of the $i^{th}$ second image $\hat{f}^i_{c1m}[n_1,n_2]$ represents a first chrominance component obtained after the $i^{th}$ CFA image is input to the first filter, $A_i$ represents a size of the $i^{th}$ CFA image, $TSE_{c1}$ represents an error function corresponding to the first chrominance component, $$\operatorname*{argmin}_{h_1} TSE_{C1}$$

represents a value of $h_1$ when a value of the error function is smallest, and $h^*_1$ represents a first filter obtained after an iterative update.

5. The method according to claim 2, wherein the second filter is trained in the following manner:

inputting CFA images corresponding to the K first images to an initialized second filter for iterative processing;

after an $i^{th}$ iteration, obtaining an error between a second chrominance component comprised in the $i^{th}$ second image that is input to the second filter during the $i^{th}$ iteration and a second chrominance component obtained after the $i^{th}$ iteration; and adjusting a parameter value in a filtering window of the second filter in an $(i+1)^{th}$ iteration process based on the error.

6. The method according to claim 5, wherein the second filter meets conditions shown in the following formulas:

$$g^i_{CFA} = f^i_{CFA} - f^i_{c1m} - f^i_L$$

$$\hat{f}^i_{c2m} = \sum_{[l_1,l_2]\in D} h_2[l_1,l_2]g^i_{CFA}[n_1-l_1, n_2-l_2]$$

$$TSE_{c2} = \sum_{i=1}^{K}\sum_{[n_1,n_2]\in A_i} \left(\hat{f}^i_{c2m}[n_1,n_2] - f^i_{c2m}[n_1,n_2]\right)^2$$

$$h^*_2 = \operatorname*{argmin}_{h_2} TSE_{C2},$$

wherein $h_2[l_1,l_2]$ represents a parameter with coordinates $[l_1,l_2]$ in the filtering window of the second filter, D represents a size of the filtering window of the second filter, $f^i_{CFA}$ represents the $i^{th}$ CFA image, $f^i_{c1m}[n_1,n_2]$ represents the first chrominance component of the $i^{th}$ second image, $f^i_L$ represents a luminance component of the $i^{th}$ second image, $A_i$ represents the size of the $i^{th}$ CFA image, $TSE_{c2}$ represents an error function corresponding to the second chrominance component, $$\operatorname*{argmin}_{h_2} TSE_{C2}$$

represents a value of $h_2$ when a value of the error function $TSE_{c2}$ is smallest, and $h^*_2$ represents a second filter obtained after an iterative update.

7. The method according to claim 1, wherein the extracting the first chrominance component of the to-be-processed color image based on the third luminance component by using a first pre-trained filter comprises:

extracting the first chrominance component of the to-be-processed color image by using the following formula:

$$C_1[n_1,n_2]=[h_1 *f^c_{CFA}[n_1,n_2]](-1)^{n_1+n_2}, \text{ wherein}$$

$C_1[n_1,n_2]$ represents an extracted first chrominance component of a pixel with coordinates $[n_1,n_2]$ in the to-be-processed color image, $h_1$ represents the first filter, and $f^c_{CFA}[n_1,n_2]$ represents a color component of the pixel with the coordinates $[n_1,n_2]$ in the to-be-processed color image before extraction is performed.

8. The method according to claim 1, wherein the extracting the second chrominance component of the to-be-processed color image based on the third luminance component and the extracted first chrominance component by using a second pre-trained filter comprises:

extracting the second chrominance component of the to-be-processed color image based on a condition shown in the following formula:

$$C_2[n_1,n_2]=[h_2*(f^c_{CFA}[n_1,n_2]-f_L[n_1,n_2]-h_1*f^c_{CFA}[n_1,n_2]](-1)^{n_1}, \text{ wherein}$$

$C_2[n_1,n_2]$ represents an extracted second chrominance component of a pixel with the coordinates $[n_1,n_2]$ in the to-be-processed color image, $h_1$ represents the first filter, $f^c_{CFA}[n_1,n_2]$ represents a color component of the pixel with the coordinates $[n_1,n_2]$ in the to-be-processed color image before extraction is performed, $h_2$ represents the second filter, and $f^c_{CFA}[n_1,n_2]$ represents a third luminance component of the pixel with the coordinates $[n_1,n_2]$ in the to-be-processed color image after registration is performed.

9. The method according to claim 1, wherein the compositing a color output image based on the extracted chrominance component of the to-be-processed color image and the third luminance component comprises:

compositing the color output image based on conditions shown in the following formulas:

$$R=f_L-C_1-2C_2$$

$$G=f_L+C_1$$

$$B=f_L-C_1+2C_2, \text{ wherein}$$

R represents a red component of the color output image, G represents a green component of the color output image, B represents a blue component of the color output image, $f_L$ represents the third luminance component, $C_1$ represents the extracted first chrominance component of the to-be-processed color image, and $C_2$ represents the extracted second chrominance component of the to-be-processed color image.

10. An electronic device, comprising:
a color camera, a monochrome camera, a memory, a screen, and a processor, wherein
the color camera and the monochrome camera are disposed in parallel on the electronic device;
the color camera is configured to photograph a static or dynamic color image;
the monochrome camera is configured to photograph a static or dynamic monochrome image;
the memory is configured to store the image photographed by the color camera and the image photographed by the monochrome camera;
the processor is configured to:
obtain a to-be-processed color image by the color camera photographing a target scenario, and extract a first luminance component of the to-be-processed color image;
obtain a monochrome image by the monochrome camera photographing the target scenario at the same moment, and extract a second luminance component of the monochrome image;
perform registration on the first luminance component and the second luminance component by using a preset algorithm, to generate a third luminance component;
extract a chrominance component of the to-be-processed color image based on the third luminance component, wherein the chrominance component of the to-be-processed color image comprises a first chrominance component and a second chrominance component, and the extracting the chrominance component of the to-be-processed color image based on the third luminance component comprises:
extracting the first chrominance component of the to-be-processed color image by using a first pre-trained filter; and
extracting the second chrominance component of the to-be-processed color image based on the third luminance component and the extracted first chrominance component by using a second pre-trained filter; and
composite a color output image based on the extracted chrominance component of the to-be-processed color image and the third luminance component; and
the screen is configured to display the color output image.

11. The electronic device according to claim 10, wherein the processor is further configured to train the first filter in the following manner:
obtaining an image training set, wherein the image training set comprises K first images, and each pixel in each first image comprises a red R component, a green G component, and a blue B component;
generating an $i^{th}$ CFA image that is corresponding to an $i^{th}$ first image and that is arranged based on a color filter array CFA;
converting, based on the $i^{th}$ CFA image, the $i^{th}$ first image into an $i^{th}$ second image whose pixel consists of one luminance component, a first chrominance component, and a second chrominance component, wherein i is any positive integer not greater than K;
inputting K CFA images to an initialized first filter for iterative processing;
after an $i^{th}$ iteration, obtaining an error between a first chrominance component comprised in the $i^{th}$ second image that is input to the first filter during the $i^{th}$ iteration and a first chrominance component obtained after the $i^{th}$ iteration; and
adjusting a parameter value in a filtering window of the first filter in an $(i+1)^{th}$ iteration process based on the error.

12. The electronic device according to claim 11, wherein the $i^{th}$ second image meets conditions shown in the following formulas:

$$f^i_L[n_1,n_2]=\tfrac{1}{4}f^i_R[n_1,n_2]+\tfrac{1}{2}f^i_G[n_1,n_2]+\tfrac{1}{4}f^i_B[n_1,n_2]$$

$$f^i_{c1m}[n_1,n_2]=(-\tfrac{1}{4}f^i_R[n_1,n_2]+\tfrac{1}{2}f^i_G[n_1,n_2]-\tfrac{1}{4}f^i_B[n_1,n_2])(-1)^{n_1+n_2}$$

$$f^i_{c2m}[n_1,n_2]=f^i_{CFA}[n_1,n_2]-f^i_L[n_1,n_2]-f^i_{c1m}[n_1,n_2], \text{ wherein}$$

$f^i_L[n_1,n_2]$ represents a luminance component of a pixel with coordinates $[n_1,n_2]$ in the $i^{th}$ second image, $f^i_{c1m}[n_1,n_2]$ represents a first chrominance component of the pixel with the coordinates $[n_1,n_2]$ in the $i^{th}$ second image $f^i_{c2m}[n_1,n_2]$ represents a second chrominance component of the pixel with the coordinates $[n_1,n_2]$ in the $i^{th}$ second image, $f^i_R[n_1,n_2]$ represents an R component of a pixel with coordinates $[n_1,n_2]$ in the $i^{th}$ first image, $f^i_G[n_1,n_2]$ represents a G component of the pixel with the coordinates $[n_1,n_2]$ in the $i^{th}$ first image, $f^i_B[n_1,n_2]$ represents a B component of the pixel with the coordinates $[n_1,n_2]$ in the $i^{th}$ first image $f^i_{CFA}[n_1,n_2]$ represents a pixel value of a pixel with coordinates $[n_1,n_2]$ in the $i^{th}$ CFA image, $n_1$ represents a horizontal pixel location in an image, and $n_2$ represents a vertical pixel location in the image.

13. The electronic device according to claim 11, wherein the first filter meets conditions shown in the following formulas:

$$\hat{f}^i_{c1m} = \sum_{[k_1,k_2] \in B} h_1[k_1, k_2] f^i_{CFA}[n_1 - k_1, n_2 - k_2]$$

$$TSE_{c1} = \sum_{i=1}^{K} \sum_{[n_1,n_2] \in A_i} \left(\hat{f}^i_{c1m}[n_1, n_2] - f^i_{c1m}[n_1, n_2]\right)^2$$

$$h_1^* = \underset{h_1}{\arg\min} TSE_{C1},$$

wherein
$h_1[k_1,k_2]$ represents a parameter with coordinates $[k_1,k_2]$ in the filtering window of the first filter, B represents a size of the filtering window of the first filter, $f^i_{CFA}[n_1-k_1,n_2-k_2]$ represents a pixel value of a pixel with coordinates $[n_1-k_1,n_2-k_2]$ in the $i^{th}$ CFA image, $f^i_{c1m}[n_1,n_2]$ represents the first chrominance component of the $i^{th}$ second image $\hat{f}^i_{c1m}[n_1,n_2]$ represents a first chrominance component obtained after the $i^{th}$ CFA image is input to the first filter, $A_i$ represents a size of the $i^{th}$ CFA image, $TSE_{c1}$ a represents an error function corresponding to the first chrominance component $$\underset{h_1}{\arg\min} TSE_{C1}$$

represents a value of $h_1$ when a value of the error function is smallest, and $h^*_1$ represents a first filter obtained after an iterative update.

14. The electronic device according to claim 11, wherein the processor is further configured to train the second filter in the following manner:
inputting CFA images corresponding to the K first images to an initialized second filter for iterative processing;
after an $i^{th}$ iteration, obtaining an error between a second chrominance component comprised in the $i^{th}$ second image that is input to the second filter during the $i^{th}$ iteration and a second chrominance component obtained after the $i^{th}$ iteration; and
adjusting a parameter value in a filtering window of the second filter in an $(i+1)^{th}$ iteration process based on the error.

15. The electronic device according to claim 14, wherein the second filter meets conditions shown in the following formulas:

$$g^i_{CFA} = f^i_{CFA} - f^i_{c1m} - f^i_L$$

$$\hat{f}^i_{c2m} = \sum_{[l_1,l_2] \in D} h_2[l_1, l_2] g^i_{CFA}[n_1 - l_1, n_2 - l_2]$$

$$TSE_{c2} = \sum_{i=1}^{K} \sum_{[n_1,n_2] \in A_i} \left(\hat{f}^i_{c2m}[n_1, n_2] - f^i_{c2m}[n_1, n_2]\right)^2$$

$$h_2^* = \underset{h_2}{\arg\min} TSE_{C2},$$

wherein $h_2[l_1,l_2]$ represents a parameter with coordinates $[l_1,l_2]$ in the filtering window of the second filter, D represents a size of the filtering window of the second filter, $f^i_{CFA}$ represents the $i^{th}$ CFA image, $f^i_{c1m}[n_1,n_2]$ represents the first chrominance component of the $i^{th}$ second image, $f^i_L$ represents a luminance component of the $i^{th}$ second image, $A_i$ represents the size of the $i^{th}$ CFA image, $TSE_{c2}$ represents an error function corresponding to the second chrominance component, arg min $TSE_{c2}$ represents a value of $h_2$ when a value of the error function $TSE_{c2}$ is smallest, and $h^*_2$ represents a second filter obtained after an iterative update.

16. The electronic device according to claim 10, wherein when extracting the first chrominance component of the to-be-processed color image based on the third luminance component by using the first pre-trained filter, the processor is specifically configured to:
extract the first chrominance component of the to-be-processed color image by using the following formula:

$C_1[n_1,n_2]=[h_1 * f^c_{CFA}[n_1,n_2]](-1)^{n_1+n_2}$, wherein $C_1[n_1,n_2]$ represents an extracted first chrominance component of a pixel with coordinates $[n_1,n_2]$ in the to-be-processed color image, $h_1$ represents the first filter, and $f^c_{CFA}[n_1,n_2]$ represents a color component of the pixel with the coordinates $[n_1,n_2]$ in the to-be-processed color image before extraction is performed.

17. The electronic device according to claim 10, wherein when extracting the second chrominance component of the to-be-processed color image based on the third luminance component and the extracted first chrominance component by using the second pre-trained filter, the processor is specifically configured to:
extract the second chrominance component of the to-be-processed color image based on a condition shown in the following formula:

$C_2[n_1,n_2]=[h_2*(f^c_{CFA}[n_1,n_2]-f^c_L[n_1,n_2]-h_1*f^c_{CFA}[n_1,n_2]](-1)^{n_1}$, wherein $C_2[n_1,n_2]$ represents an extracted second chrominance component of a pixel with the coordinates $[n_1,n_2]$ in the to-be-processed color image, $h_1$ represents the first filter, $f^c_{CFA}[n_1,n_2]$ represents a color component of the pixel with the coordinates $[n_1,n_2]$ in the to-be-processed color image before extraction is performed, $h_2$ represents the second filter, and $f^c_L[n_1,n_2]$ represents a third luminance component of the pixel with the coordinates $[n_1,n_2]$ in the to-be-processed color image after registration is performed.

18. The electronic device according to claim 10, wherein when compositing the color output image based on the extracted chrominance component of the to-be-processed color image and the third luminance component, the processor is specifically configured to:
generate, based on conditions shown in the following formulas, the color image corresponding to the to-be-processed color image:

$R=f_L-C_1-2C_2$ $G=f_L+C_1$ $B=f_L-C_1+2C_2$, wherein

R represents a red component of the color output image, G represents a green component of the color output image, B represents a blue component of the color output image, $f_L$ represents the extracted third luminance component of the to-be-processed color image, $C_1$ represents the extracted first chrominance component of the to-be-processed color image, and $C_2$ represents the extracted second chrominance component of the to-be-processed color image.

* * * * *